(12) United States Patent
Teramoto et al.

(10) Patent No.: US 9,731,774 B2
(45) Date of Patent: Aug. 15, 2017

(54) VEHICLE FRONT STRUCTURE AND ASSEMBLY METHOD OF VEHICLE FRONT STRUCTURE

(71) Applicant: TOYOTA JIDOSHA KABUSHIKI KAISHA, Toyota-shi (JP)

(72) Inventors: Daisuke Teramoto, Toyota (JP); Hideyuki Yoshioka, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/962,308

(22) Filed: Dec. 8, 2015

(65) Prior Publication Data

US 2016/0159408 A1   Jun. 9, 2016

(30) Foreign Application Priority Data

Dec. 9, 2014   (JP) .................................. 2014-249130

(51) Int. Cl.
| | |
|---|---|
| *B62D 27/02* | (2006.01) |
| *B62D 25/04* | (2006.01) |
| *B62D 25/08* | (2006.01) |
| *B62D 25/02* | (2006.01) |
| *B23K 31/02* | (2006.01) |

(52) U.S. Cl.
CPC ............ *B62D 27/023* (2013.01); *B23K 31/02* (2013.01); *B62D 25/02* (2013.01); *B62D 25/04* (2013.01); *B62D 25/081* (2013.01)

(58) Field of Classification Search
CPC ...... B62D 25/04; B62D 25/08; B62D 25/081; B62D 25/082; B62D 27/023

USPC ................... 296/192, 193.02, 193.06, 203.02
See application file for complete search history.

(56) References Cited

U.S. PATENT DOCUMENTS

| | | | |
|---|---|---|---|
| 4,270,793 A | 6/1981 | Harasaki et al. | |
| 4,964,672 A * | 10/1990 | Fujii ................... | B62D 25/081 296/192 |
| 6,322,134 B1 | 11/2001 | Yang | |
| 2016/0194033 A1* | 7/2016 | Kondo .................. | B62D 25/04 296/192 |

FOREIGN PATENT DOCUMENTS

| | | |
|---|---|---|
| FR | 2 919 562 A1 | 2/2009 |
| JP | 63-105575 U | 7/1988 |
| JP | 02037084 A * | 2/1990 |
| JP | 11-115801 | 4/1999 |
| JP | 2004-276789 A | 10/2004 |
| JP | 2007-30720 A | 2/2007 |
| JP | 2010-137625 A | 6/2010 |

* cited by examiner

*Primary Examiner* — Jason S Daniels
(74) *Attorney, Agent, or Firm* — Oblon, McClelland, Maier & Neustadt, L.L.P.

(57) ABSTRACT

The front pillar includes a pillar outer panel and a pillar inner panel. The pillar outer panel is disposed on an outside in a vehicle width direction. The pillar inner panel is disposed on an inside in the vehicle width direction. The pillar outer panel and the pillar inner panel form a closed cross-section. A cowl extends in the vehicle width direction and includes a cowl-side bent portion. The cowl-side bent portion is an end of the cowl on the outside in the vehicle width direction that is bent toward a rear side in a vehicle front-rear direction, and laid and welded on the outside in the vehicle width direction of a front end of the pillar inner panel.

3 Claims, 21 Drawing Sheets

110 VEHICLE FRONT
130 FRONT PILLAR
132 PILLAR OUTER PANEL
135 REAR-SIDE INNER PANEL
136 PILLAR INNER PANEL
137 FRONT-SIDE INNER PANEL
138 INNER-SIDE BENT PORTION
140 COWL
142 COWL-SIDE BENT PORTION
150 GUSSET
160 COWL REINFORCEMENT

10 VEHICLE FRONT
30 FRONT PILLAR
50 GUSSET
60 COWL REINFORCEMENT

32 PILLAR OUTER PANEL
36 PILLAR INNER PANEL

38 INNER-SIDE BENT PORTION
42 COWL-SIDE BENT PORTION

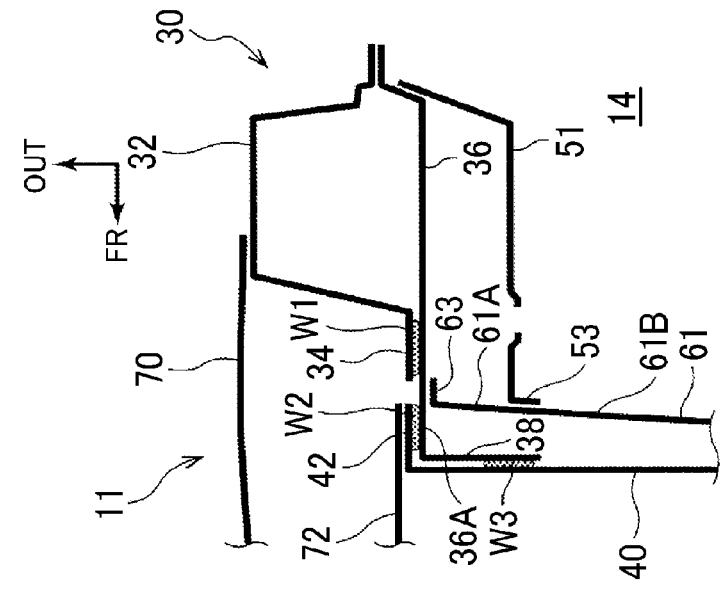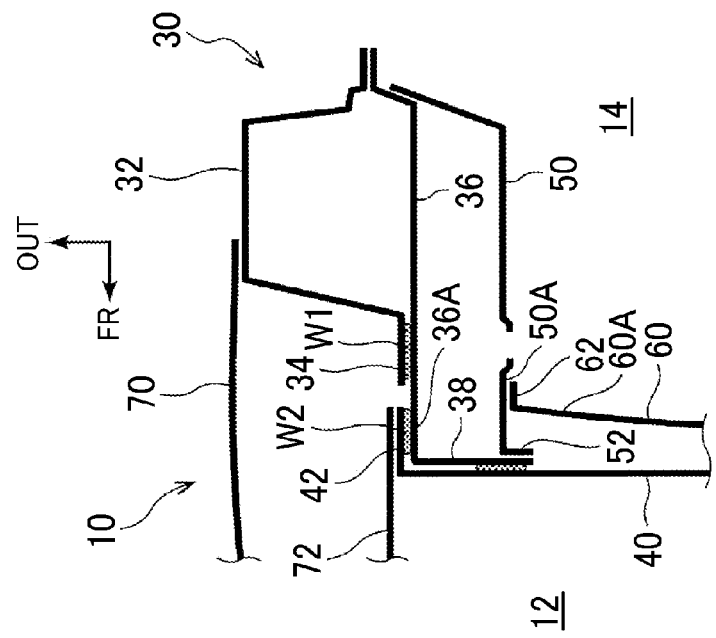

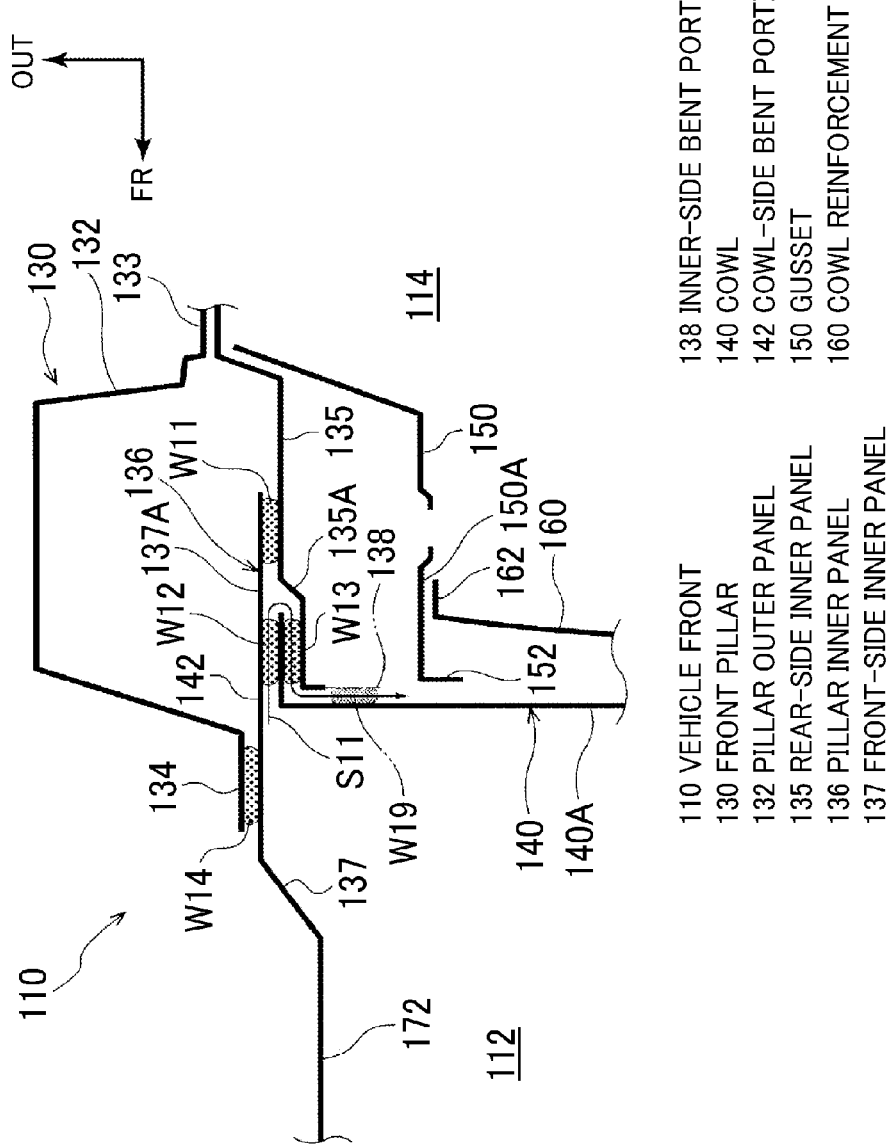

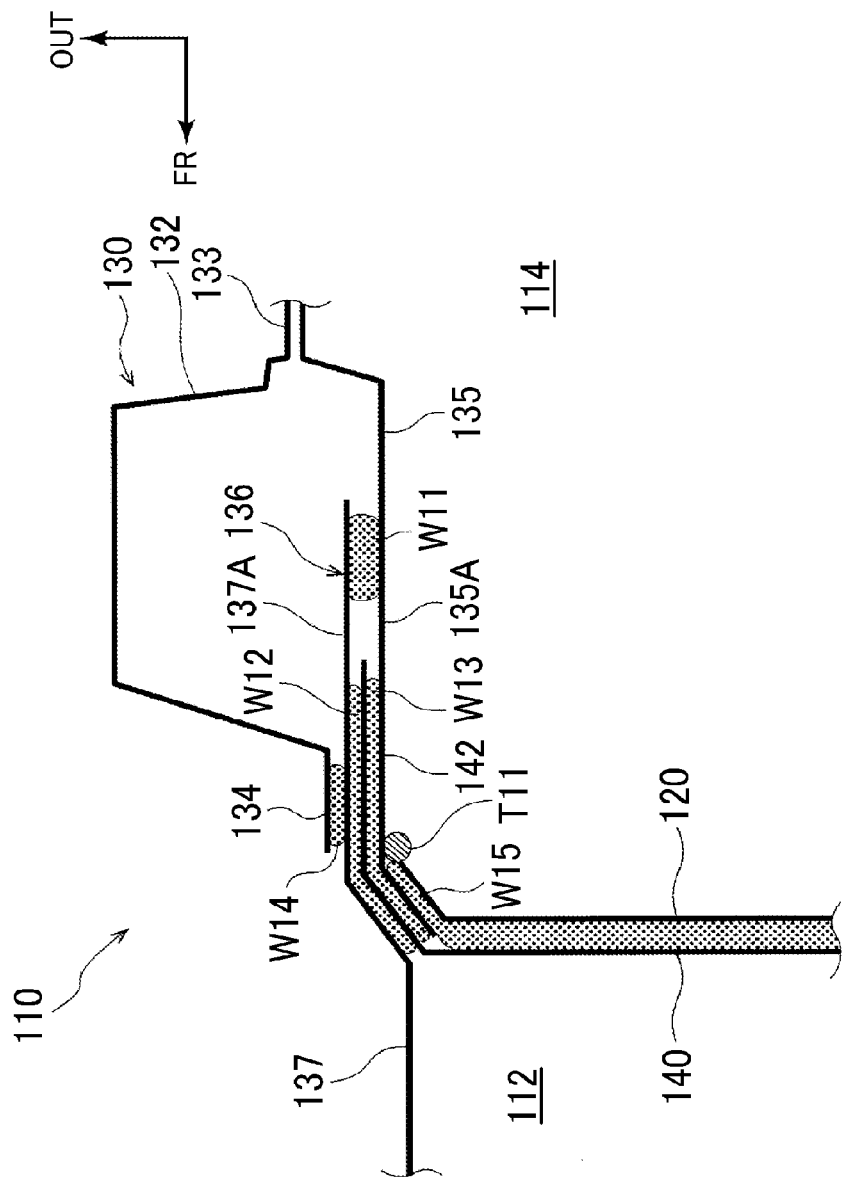

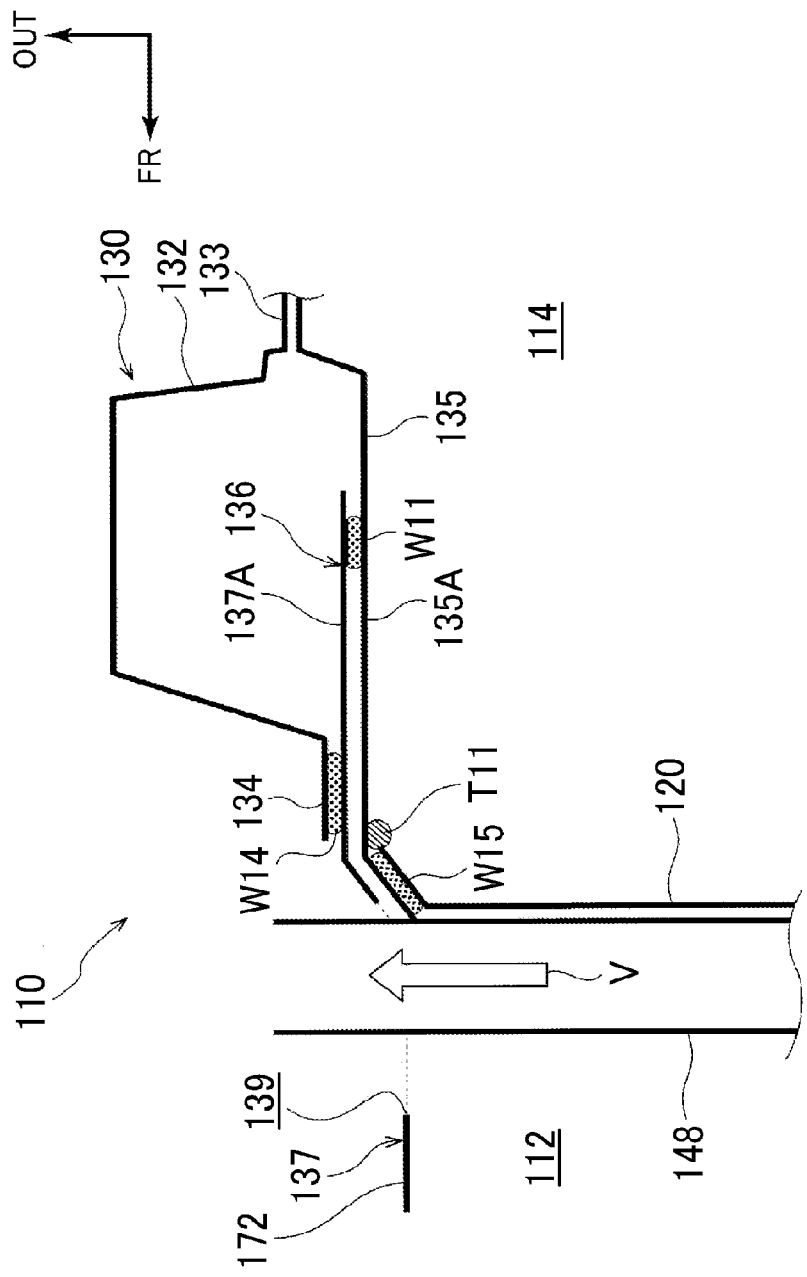

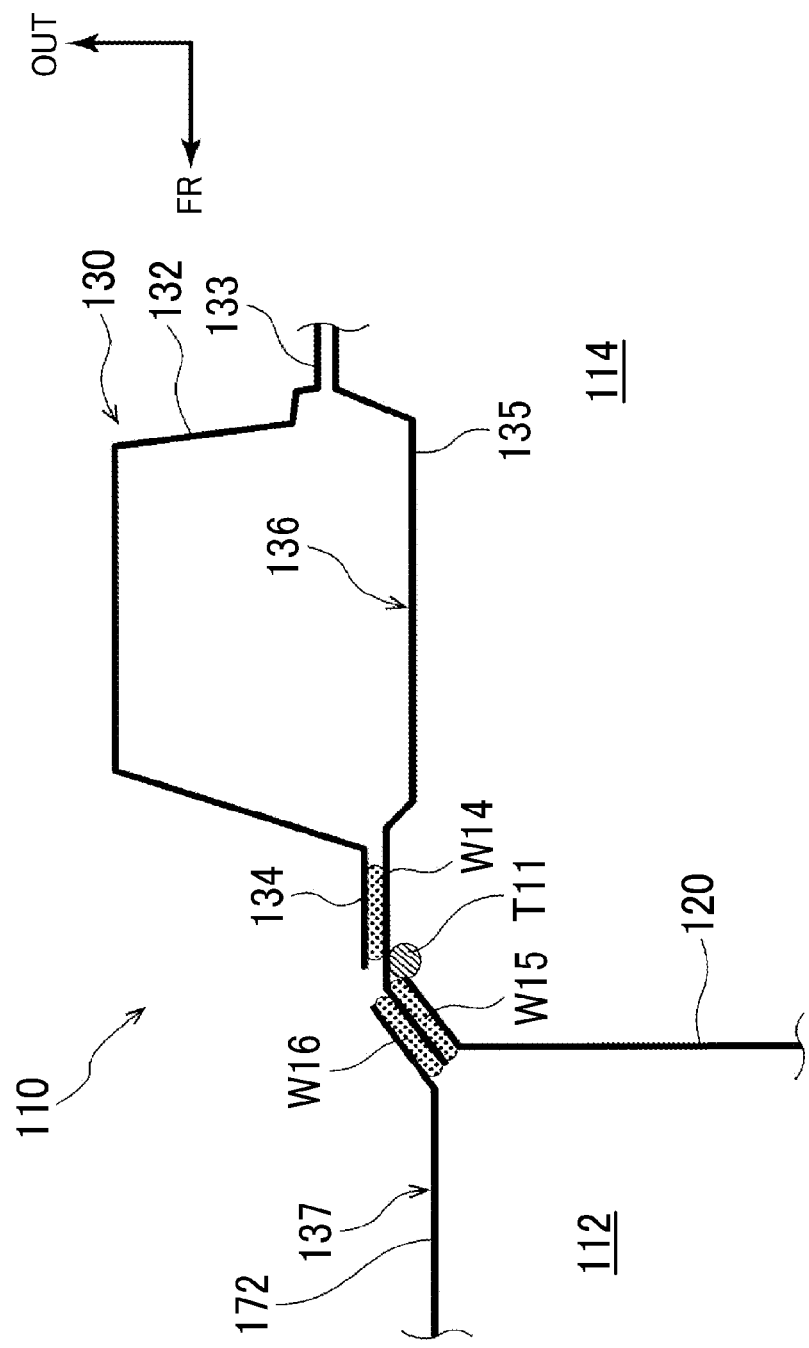

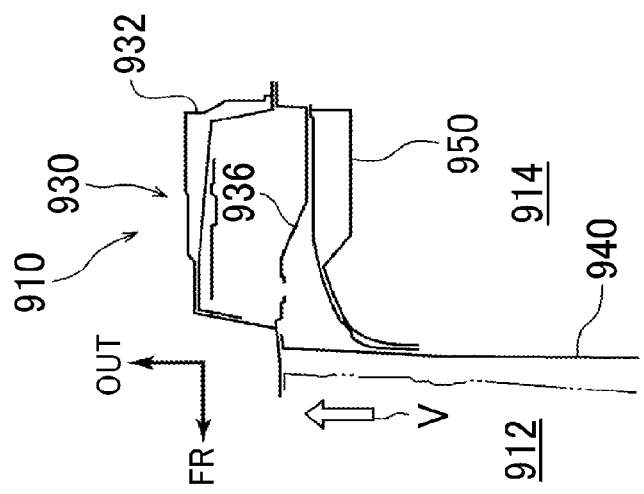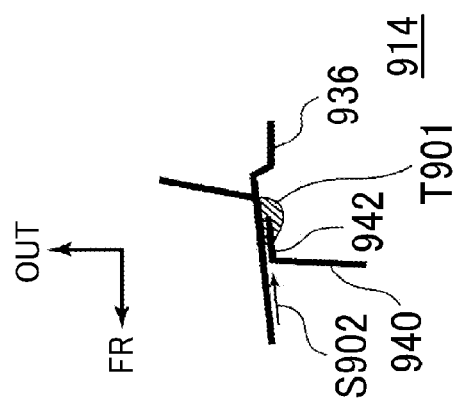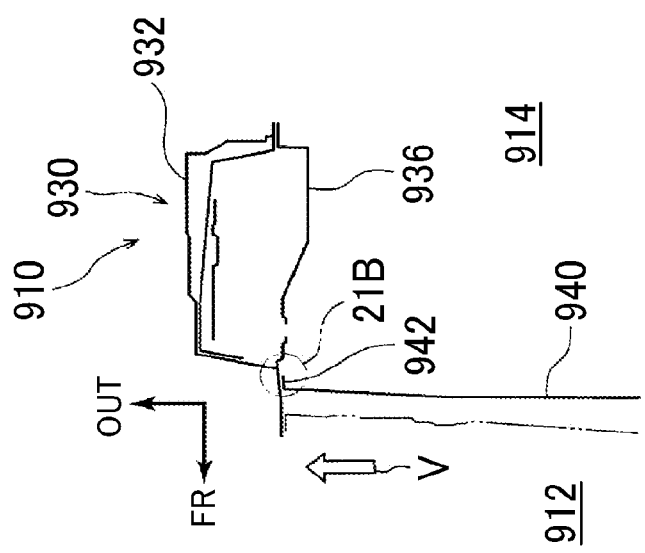

VEHICLE FRONT STRUCTURE AND ASSEMBLY METHOD OF VEHICLE FRONT STRUCTURE

INCORPORATION BY REFERENCE

The disclosure of Japanese Patent Application No. 2014-249130 filed on Dec. 9, 2014 including the specification, drawings and abstract is incorporated herein by reference in its entirety.

BACKGROUND OF THE INVENTION

1. Field of the Invention

The present invention relates to a vehicle front structure and an assembly method of a vehicle front structure.

2. Description of Related Art

Japanese Patent Application Publication No. 11-115801 discloses a front pillar structure that includes a front pillar reinforcement inside a closed cross-section formed by a side outer panel and a front pillar inner panel. In this related art, front ends of the side outer panel and the front pillar inner panel are connected by welding with a side end of a cowl inner panel. In this welded connection part, the cowl inner panel is connected on the side of the side outer panel (see JP 11-115801 A).

Another related art is disclosed in Japanese Utility Model Application Publication No. 63-105575.

SUMMARY OF THE INVENTION

Here, for example, compared with a waterproofing method in which members are fastened with bolts and a sealer is applied to the end of the connection part, a structure in which members are welded as in the above related art and the mating surfaces of the connection part (welded part) are waterproofed with a foaming sealer is considered to be superior in waterproofing performance.

In the above related art, however, the cowl inner panel and the front pillar are connected with each other through the side outer panel. Thus, there is room for improvement in terms of the rigidity of the body.

Taking this fact into account, the present invention provides a vehicle front structure and an assembly method of a vehicle front structure that can improve the waterproofing performance while securing the rigidity of the body.

According to an aspect of the present invention, a vehicle front structure includes a front pillar and a cowl. The front pillar extends on a vehicle side part, in a vehicle upper-lower direction. The front pillar includes a pillar outer panel and a pillar inner panel. The pillar outer panel is disposed on an outside in a vehicle width direction. The pillar inner panel is disposed on an inside in the vehicle width direction. The pillar outer panel and the pillar inner panel form a closed cross-section. The cowl extends in the vehicle width direction. The cowl includes a cowl-side bent portion. The cowl-side bent portion is an end of the cowl on the outside in the vehicle width direction that is bent toward a rear side in a vehicle front-rear direction. The cowl-side bent portion is laid and welded on the outside in the vehicle width direction of a front end of the pillar inner panel.

In the above aspect, the front end of the pillar inner panel of the front pillar and the cowl-side bent portion of the cowl are welded with each other. The cowl-side bent portion is welded on the outside in the vehicle width direction of the front end of the pillar inner panel. Accordingly, the waterproofing performance is improved, since the position of a water ingress path is shifted from the rear side to the front side in the vehicle front-rear direction and the welded part is provided in the ingress path. Thus, the waterproofing performance is improved while the rigidity of the body is secured.

In the above aspect, the pillar inner panel may include an inner-side bent portion. The inner-side bent portion is an end of the cowl on the front side in the vehicle front-rear direction that is bent toward the inside in the vehicle width direction. The inner-side bent portion may be laid and welded on the rear side in the vehicle front-rear direction of the cowl.

In the above aspect, the cowl-side bent portion of the cowl is welded on the outside in the vehicle width direction of the front end of the pillar inner panel of the front pillar, and moreover, the inner-side bent portion of the pillar inner panel is laid and welded on the rear side in the vehicle front-rear direction of the cowl.

Accordingly, the waterproofing performance is further improved, since the water ingress path assumes an L-shape in a plan view and the two welded parts are provided in the ingress path. In addition, the rigidity of the body is enhanced, since the pillar inner panel and the cowl are welded with each other at two positions.

In the above aspect, the pillar inner panel may include a rear-side inner panel and a front-side inner panel. The rear-side inner panel may constitute the rear side in the vehicle front-rear direction. The front-side inner panel may constitute the front side in the vehicle front-rear direction. A rear end of the front-side inner panel may be laid and welded on the outside in the vehicle width direction of a front end of the rear-side inner panel. The cowl-side bent portion may be held between the front end of the rear-side inner panel and the rear end of the front-side inner panel.

In the above aspect, the cowl-side bent portion is held and welded between the front end of the rear-side inner panel and the rear end of the front-side inner panel of the pillar inner panel. Thus, the waterproofing performance is improved, since the water ingress path assumes a U-shape in a plan view and is provided with the two welded parts.

The pillar outer panel is welded on the outside in the vehicle width direction of the pillar inner panel in which the cowl-side bent portion of the cowl is held and welded between the front end of the rear-side inner panel and the rear end of the front-side inner panel. Accordingly, it is possible to freely set the position in the vehicle front-rear direction of the pillar outer panel according to the design, regardless of the position of connection between the cowl and the pillar inner panel.

In the above aspect, the vehicle front structure may further include a gusset that is welded on the inside in the vehicle width direction of the pillar inner panel and on the rear side in the vehicle front-rear direction of the cowl.

In the above aspect, since the gusset is welded on the inside in the vehicle width direction of the pillar inner panel and on the rear side in the vehicle front-rear direction of the cowl, the strength of connection between the pillar inner panel and the cowl is enhanced, so that the rigidity of the body is effectively enhanced.

According to another aspect, an assembly method of a vehicle front structure includes welding a pillar inner panel and a cowl with each other, welding a gusset onto the welded pillar inner panel and cowl, and welding a pillar outer panel onto the pillar inner panel on which the gusset has been welded. The vehicle front structure includes a front pillar, the cowl, and the gusset. The front pillar extends on a vehicle side part, in a vehicle upper-lower direction. The front pillar includes a pillar outer panel and a pillar inner panel. The pillar outer panel is disposed on an outside in a vehicle width direction. The pillar inner panel is disposed on an inside in the vehicle width direction. The pillar outer panel and the pillar inner panel form a closed cross-section. The cowl extends in the vehicle width direction, and the cowl includes a cowl-side bent portion. The cowl-side bent portion is an end of the cowl on the outside in the vehicle width direction that is bent toward a rear side in a vehicle front-rear direction, and the cowl-side bent portion is laid and welded on the outside in the vehicle width direction of an end of the pillar inner panel. The gusset is welded on the inside in the vehicle width direction of the pillar inner panel and on the rear side in the vehicle front-rear direction of the cowl.

In the above aspect, the waterproofing performance is improved, since the cowl-side bent portion of the cowl is welded on the outside in the vehicle width direction of the front end of the pillar inner panel of the front pillar.

Moreover, the pillar outer panel of the front pillar is welded onto the pillar inner panel after the gusset is welded onto the pillar inner panel of the front pillar and the cowl. Thus, since the gusset can be welded onto the pillar inner panel and the cowl, the strength of connection between the pillar inner panel and the cowl is enhanced, so that the rigidity of the body is effectively enhanced.

According to the above aspect, it is possible to improve the waterproofing performance while securing the rigidity of the body.

According to the above aspect, it is possible to enhance the rigidity of the body while further improving the waterproofing performance.

According to the above aspect, it is possible to freely set the position in the vehicle front-rear direction of the pillar outer panel of the front pillar according to the design while further improving the waterproofing performance.

According to the above aspect, it is possible to effectively enhance the rigidity of the body by enhancing the strength of connection between the pillar inner panel and the cowl.

According to the above aspect, it is possible to effectively enhance the rigidity of the body by enhancing the strength of connection between the pillar inner panel and the cowl while improving the waterproofing performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14A is a cross-sectional view of a gusset-prioritized structure;

FIG. 14B is a cross-sectional view of a cowl reinforcement-prioritized structure;

FIG. 15 is a cross-sectional view along the line 15-15 of FIG. 20;

FIG. 16 is a cross-sectional view along the line 16-16 of FIG. 20;

FIG. 17 is a cross-sectional view along the line 17-17 of FIG. 20;

FIG. 18 is a cross-sectional view along the line 18-18 of FIG. 20;

FIG. 21A is a cross-sectional view of a vehicle front of a comparable example in a state where a gusset is not yet connected to the vehicle front;

FIG. 21B is a partially enlarged cross-sectional view of the part 21B of FIG. 21A; and FIG. 21C is a cross-sectional view of a state where the gusset is connected to the vehicle front of FIG. 21A.

DETAILED DESCRIPTION OF EMBODIMENTS

Figure 1:
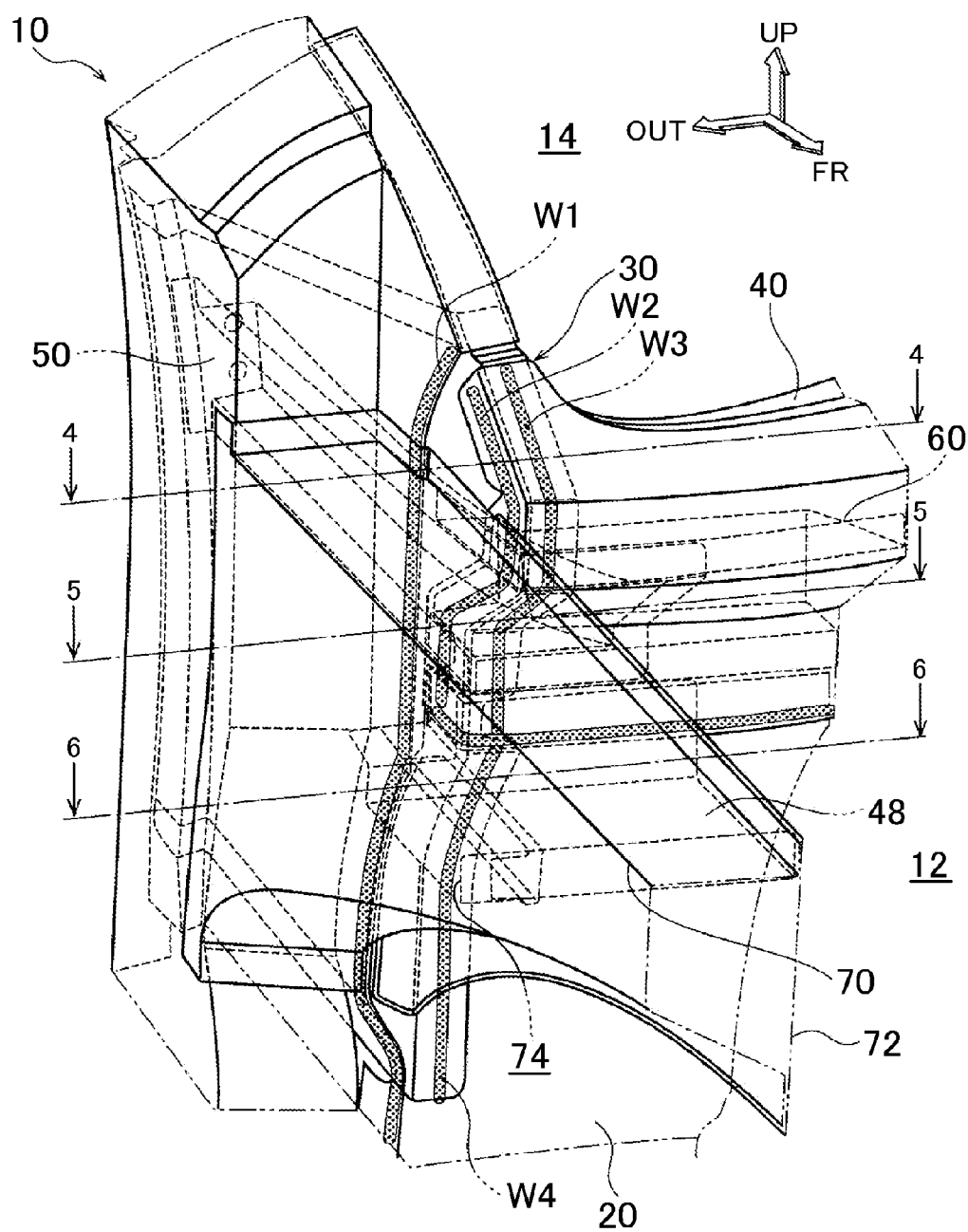
FIG. 1 is an oblique external perspective view of a vehicle front of a first embodiment from a front side in a vehicle front-rear direction.

A vehicle front structure according to a first embodiment of the present invention will be described using FIG. 1 through FIG. 13.

As the left and right sides of a vehicle front have the same structure except for being left-right symmetrical, the right side of the vehicle front will be illustrated and described. The arrow FR, the arrow OUT, and the arrow UP shown in the drawings indicate the front side in the vehicle front-rear direction, the outside in the vehicle width direction, and the upper side in the vehicle upper-lower direction, respectively.

For clarity, members are schematically shown in the drawings by so-called line drawing, although the members actually have a thickness. While a clearance is shown at connection parts of the members, the members are actually in contact with one another.

The members are connected by welding. A foaming sealer is applied in advance to the mating surfaces of connection parts (welded parts) of the members. These mating surfaces are sealed as the foaming sealer foams through heat during a coating step etc. Those sealed parts where mating surfaces are sealed through foaming of a foaming sealer are dotted and denoted by the reference sign W in the drawings. Those sealed parts where mating surfaces are sealed with a coating sealer applied after assembly are shaded and denoted by the reference sign T. These reference signs W and T indicate only major sealed parts, and do not indicate all the sealed parts.

The above description also applies to a second embodiment to be described later.

(Overall Structure)

First, a general description will be given of the overall structure of a vehicle front 10 of this embodiment.

Figure 13:
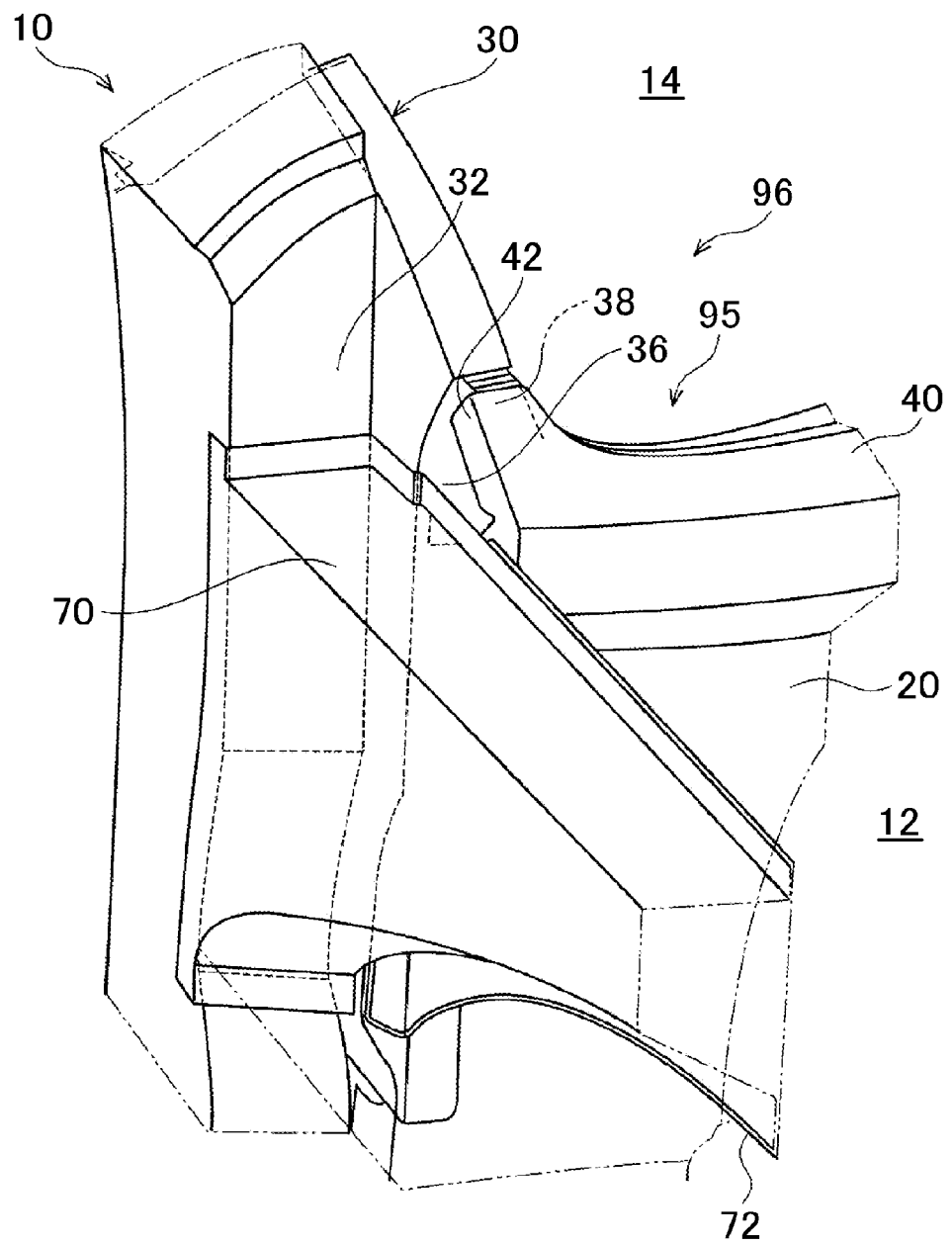
FIG. 13 is a view illustrating an assembly step of the vehicle front of the first embodiment, and represents a perspective view showing the vehicle front in which a cowl top-side outer panel is connected to the first main body assembly of FIG. 12.

As shown in FIG. 1 through FIG. 3 and FIG. 13, the vehicle front 10 is provided with a front pillar 30 along the vehicle upper-lower direction, on a vehicle side part on the outside in the vehicle width direction. FIG. 13 is a view in which the parts sealed by a foaming seal (denoted by the reference sign W) and the chain lines (hidden lines) of FIG. 1 are omitted as appropriate.

Figure 4:
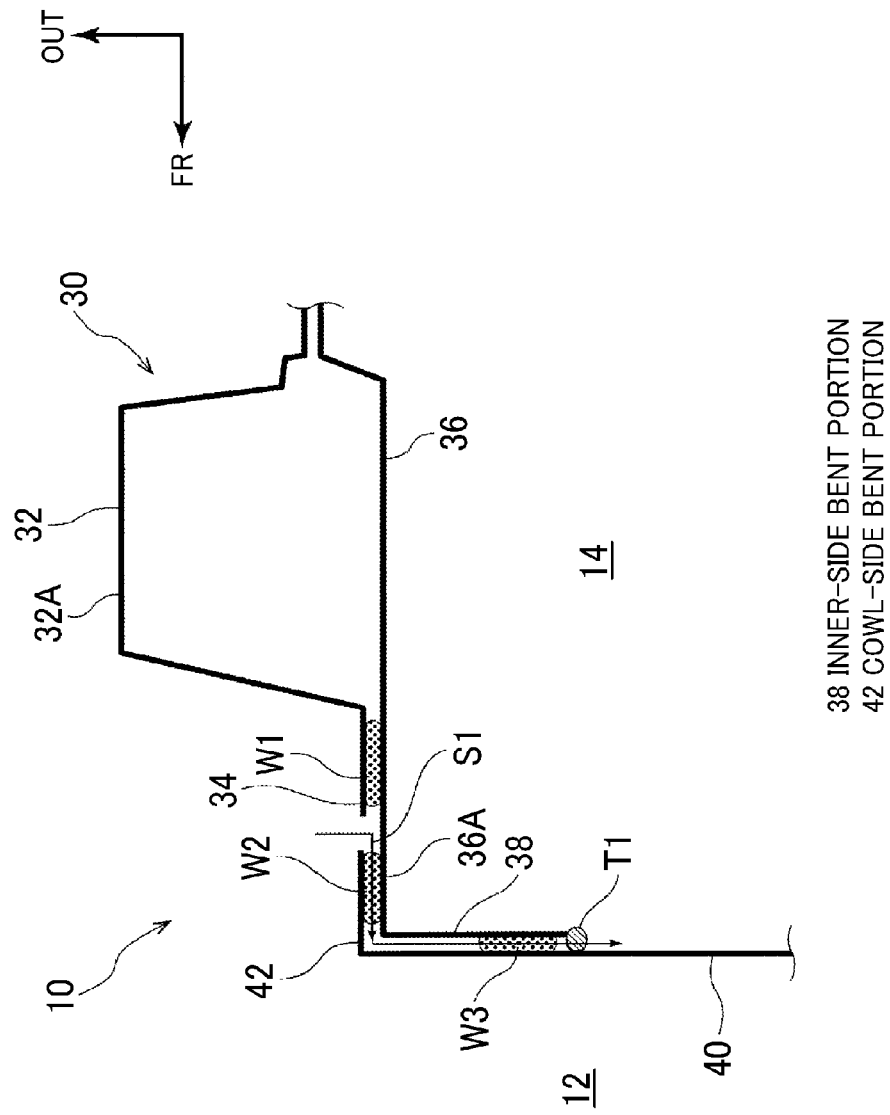
FIG. 4 is a cross-sectional view along the line 4-4 of FIG. 1.

As shown in FIG. 4, the front pillar 30 includes a pillar outer panel 32 having a hat-shaped cross-section that is disposed so as to be open on the inside in the vehicle width direction and constitutes the outside in the vehicle width direction of the front pillar 30, and a pillar inner panel 36 that constitutes the inside in the vehicle width direction of the front pillar 30. These panels are connected with each other to form a closed cross-section. Optionally, a front pillar outer reinforcement may be provided between the pillar outer panel 32 and the pillar inner panel 36.

Figure 2:
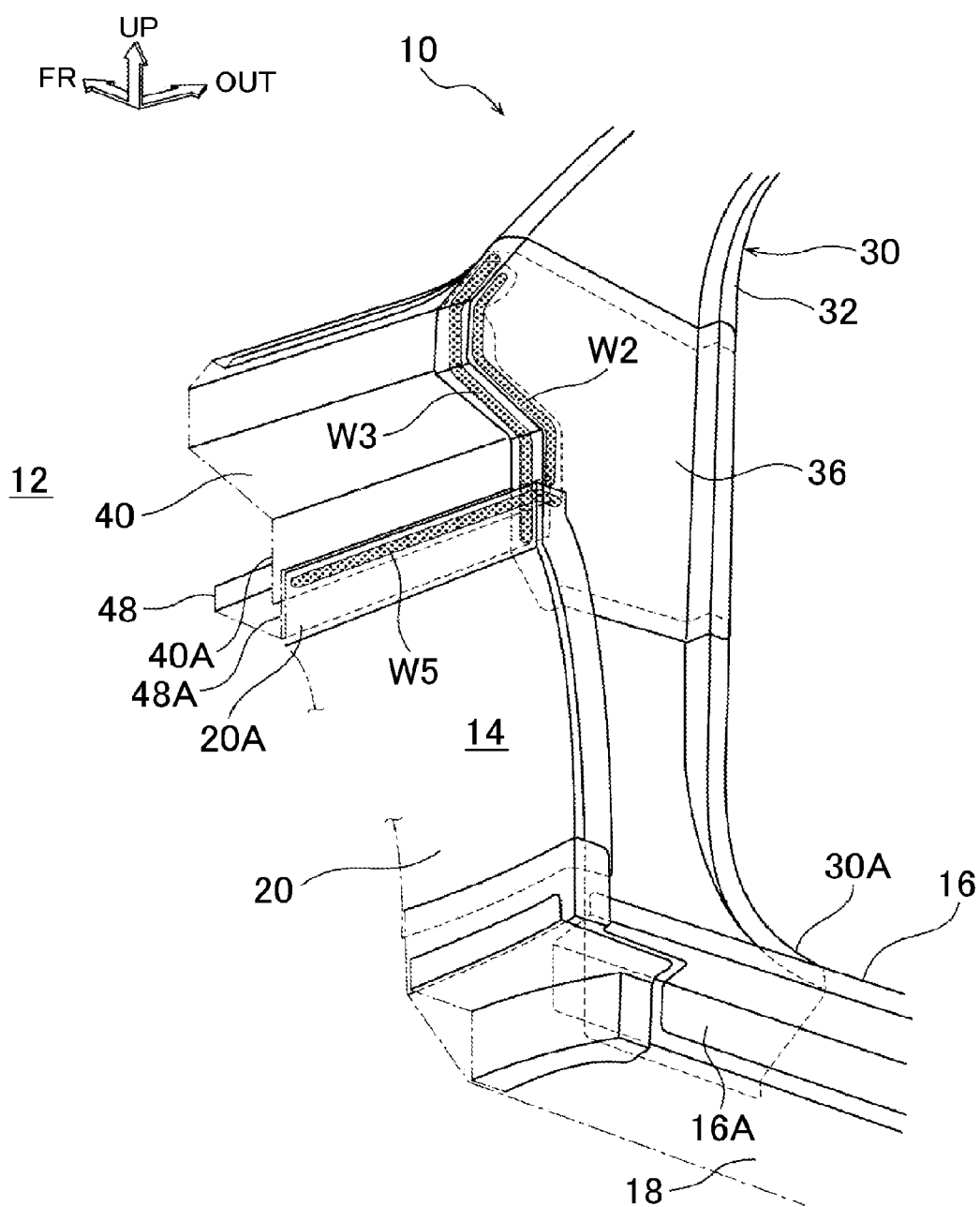
FIG. 2 is a perspective view, from a vehicle interior side, of the vehicle front of the first embodiment in a state where a cowl reinforcement and a gusset are not connected to the vehicle front.
Figure 3:
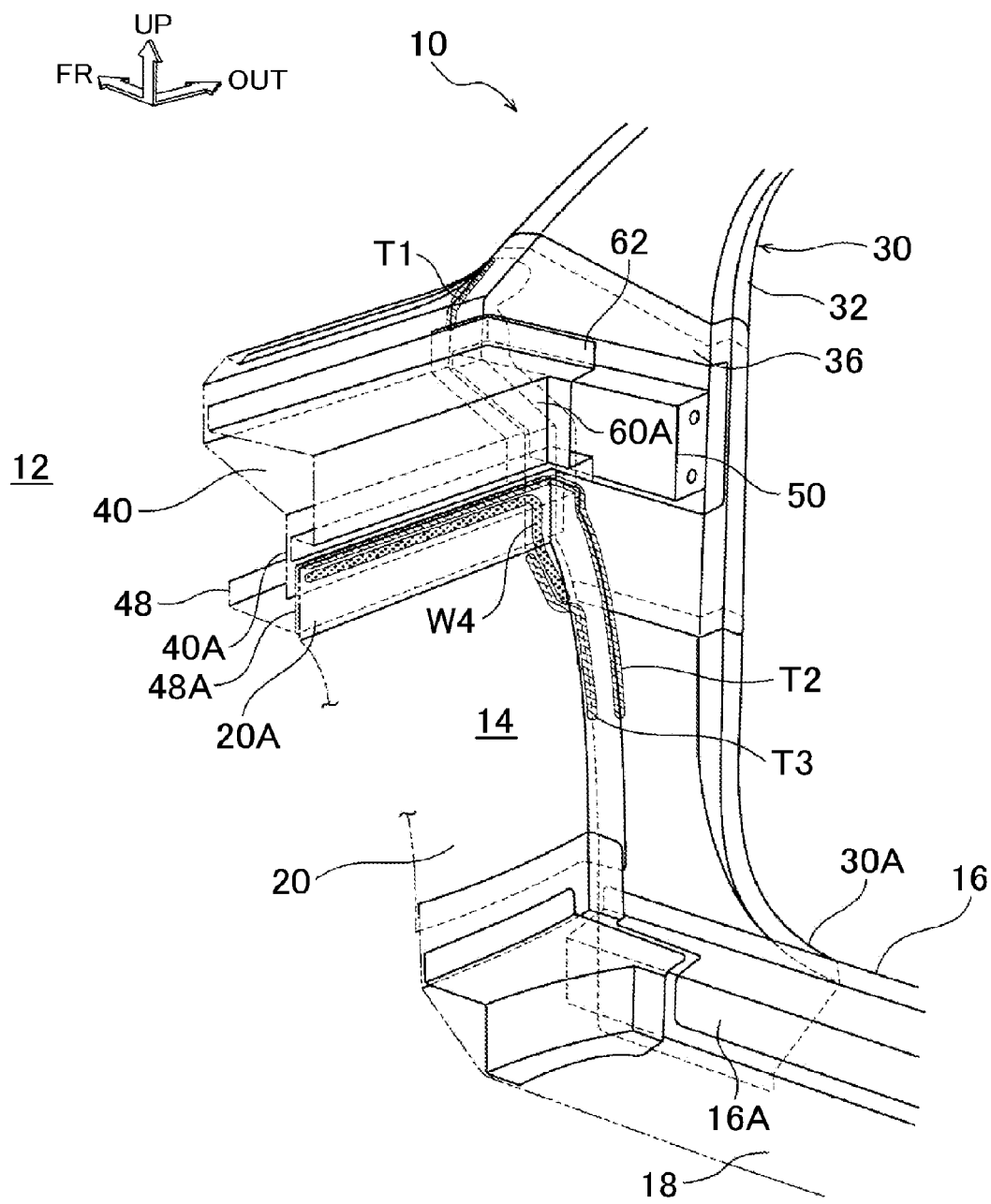
FIG. 3 is a perspective view, from the vehicle interior side, of the vehicle front of the first embodiment in a state where the cowl reinforcement and the gusset are connected to the vehicle front of FIG. 2.

As shown in FIG. 2 and FIG. 3, a rocker 16 having a closed cross-sectional structure is provided along the vehicle front-rear direction, on a vehicle side part on the outside in the vehicle width direction in a lower part of the vehicle front 10. The rocker 16 is connected with a floor panel 18 that constitutes the vehicle bottom. A front end 16A of this rocker 16 is connected with a lower end 30A of the above-described front pillar 30.

The vehicle front 10 is provided with a dashboard panel 20 that separates between an engine room 12 and a vehicle interior 14. A part of the dashboard panel 20 on the outside in the vehicle width direction is connected with the front pillar 30 (see also FIG. 1).

As shown in FIG. 1 through FIG. 3, a panel-shaped cowl 40 extending in the vehicle width direction is disposed on the upper side in the vehicle upper-lower direction of the dashboard panel 20, and the cowl 40 is connected with the dashboard panel 20 and the front pillar 30. On the lower side of the vehicle, on the front side in the vehicle front-rear direction of the connection part between an upper end 20A of the dashboard panel 20 and a lower end 40A of the cowl 40 (see FIG. 2 and FIG. 3), a groove-shaped gutter 48 extending in the vehicle width direction and serving as a water passage is provided (see also FIG. 6 and FIG. 7).

As shown in FIG. 2 and FIG. 3, a side wall 48A of the gutter 48 on the rear side in the vehicle front-rear direction is held (laid) and connected between the upper end 20A of the dashboard panel 20 disposed on the rear side in the vehicle front-rear direction and the lower end 40A of the cowl 40 disposed on the front side in the vehicle front-rear direction.

Figure 6:
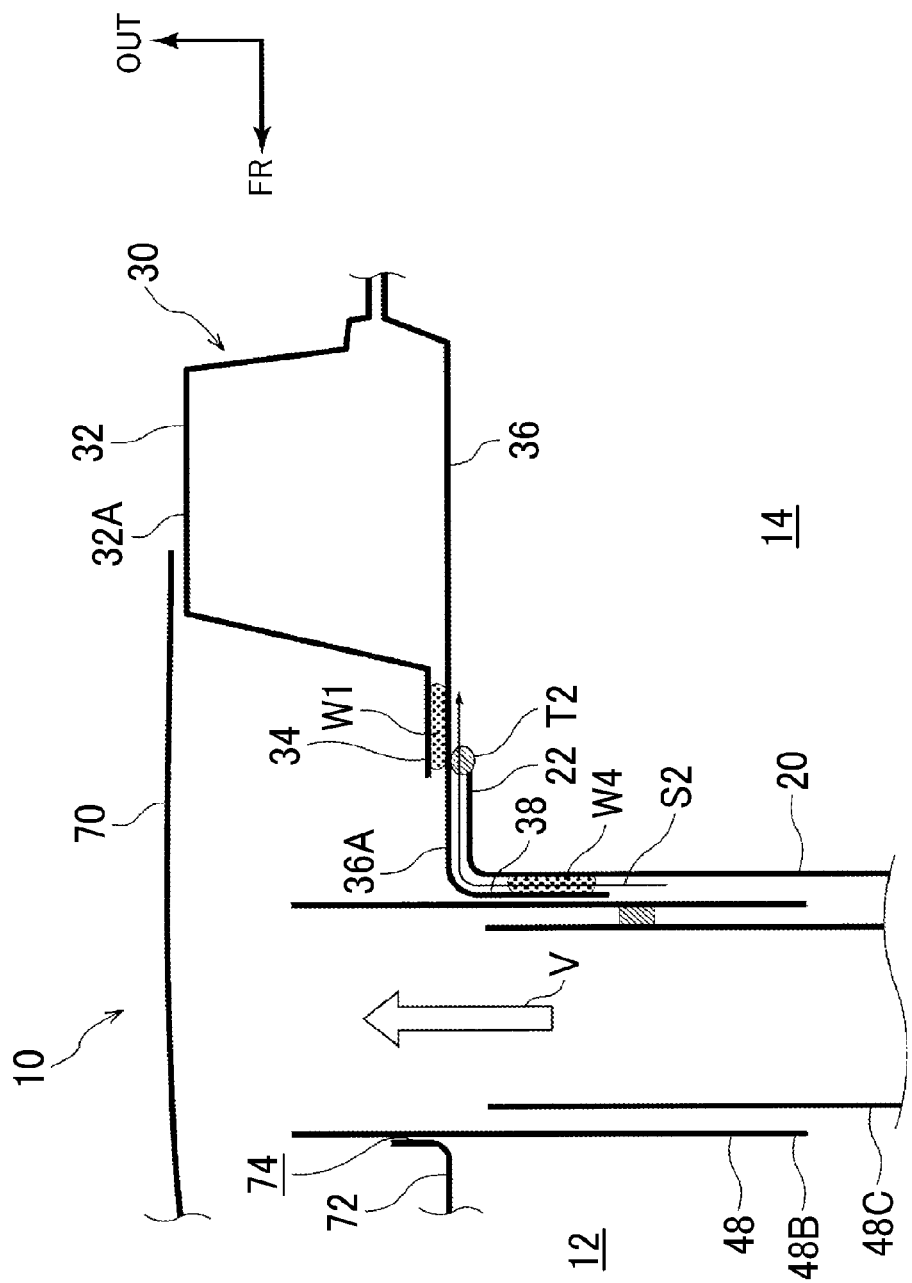
FIG. 6 is a cross-sectional view along the line 6-6 of FIG. 1.

As shown in FIG. 6, the gutter 48 is composed of a first gutter 48B and a second gutter 48C in this embodiment. The first gutter 48B and the second gutter 48C are not differentiated in the drawings other than FIG. 6. The gutter 48 may be integrally molded on the cowl 40.

Figure 5:
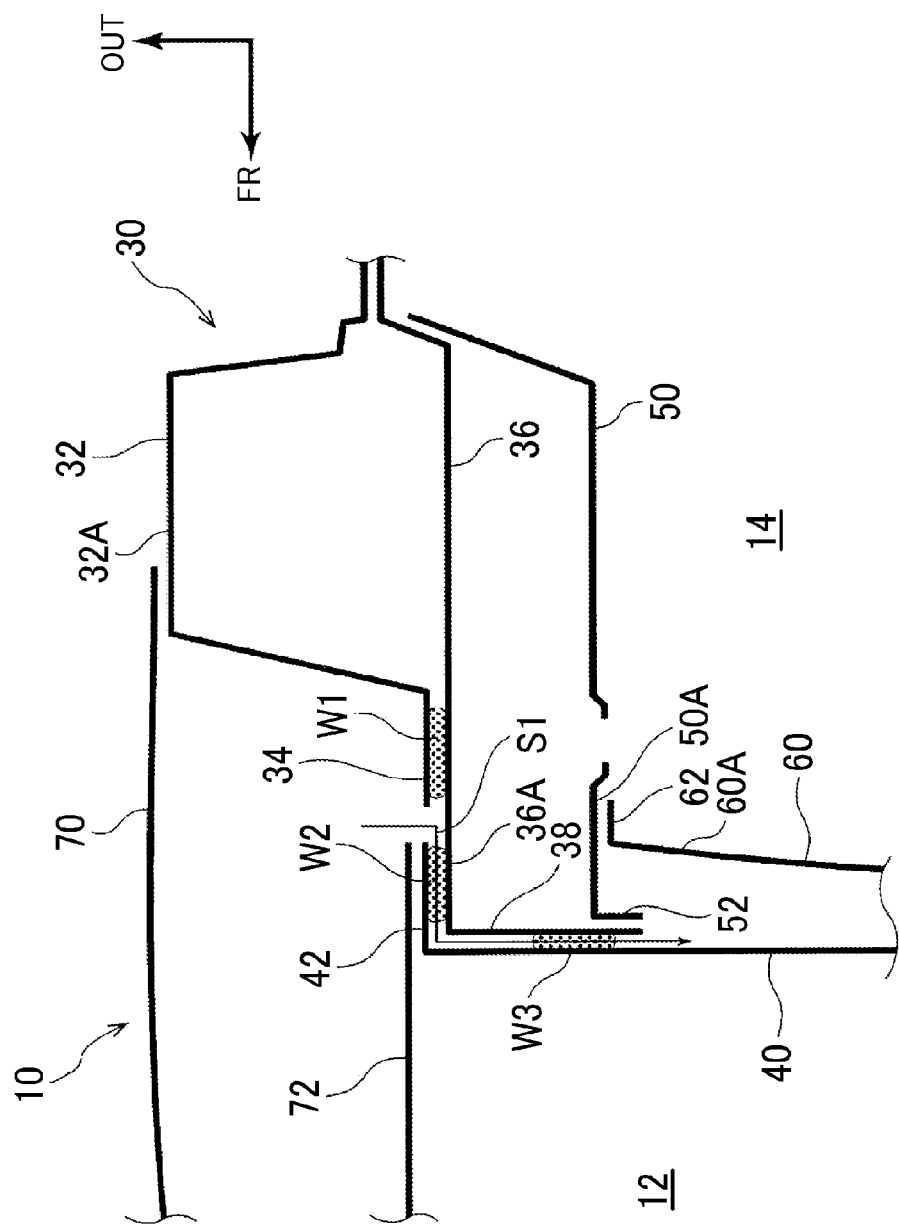
FIG. 5 is a cross-sectional view along the line 5-5 of FIG. 1.

As shown in FIG. 1 and FIG. 3, a gusset 50 for rigidity reinforcement (see also FIG. 9) is provided on the outside in the vehicle width direction of the front pillar 30, on the upper side in the vehicle upper-lower direction of the gutter 48. As shown in FIG. 3 and FIG. 5, the gusset 50 is connected with the pillar inner panel 36 of the front pillar 30 and the cowl 40.

As shown in FIG. 1 and FIG. 3, a cowl reinforcement 60 (see also FIG. 9) extending in the vehicle width direction is provided on the rear side in the vehicle front-rear direction of the cowl 40. As shown in FIG. 3 and FIG. 5, the cowl reinforcement 60 is connected with the gusset 50.

As shown in FIG. 1, FIG. 5, FIG. 6, and FIG. 13, a cowl top-side outer panel 70 and a cowl top-side inner panel 72 extending in the vehicle front-rear direction are provided on the front side in the vehicle front-rear direction of the front pillar 30. As shown in FIG. 5 and FIG. 6, the cowl top-side outer panel 70 is connected on a side wall 32A on the outside in the vehicle width direction of the pillar outer panel 32 of the front pillar 30. As shown in FIG. 5, the cowl top-side inner panel 72 is connected on the outside in the vehicle width direction of the connection part between the cowl 40 and the pillar inner panel 36 of the front pillar 30.

As shown in FIG. 6, a cutout portion 74 is formed (see also FIG. 1, FIG. 8, and FIG. 10) in a part of the cowl top-side inner panel 72 where the gutter 48 is provided.

Next, the structure of the major part of the vehicle front 10 of this embodiment will be described.

As shown in FIG. 4 through FIG. 6, a flange 34 on the front side in the vehicle front-rear direction of the pillar outer panel 32 of the front pillar 30 and the pillar inner panel 36 are connected with each other by welding, and the connection part is sealed with a foaming sealer W1 extending in the vehicle upper-lower direction (see also FIG. 1).

Figure 7:
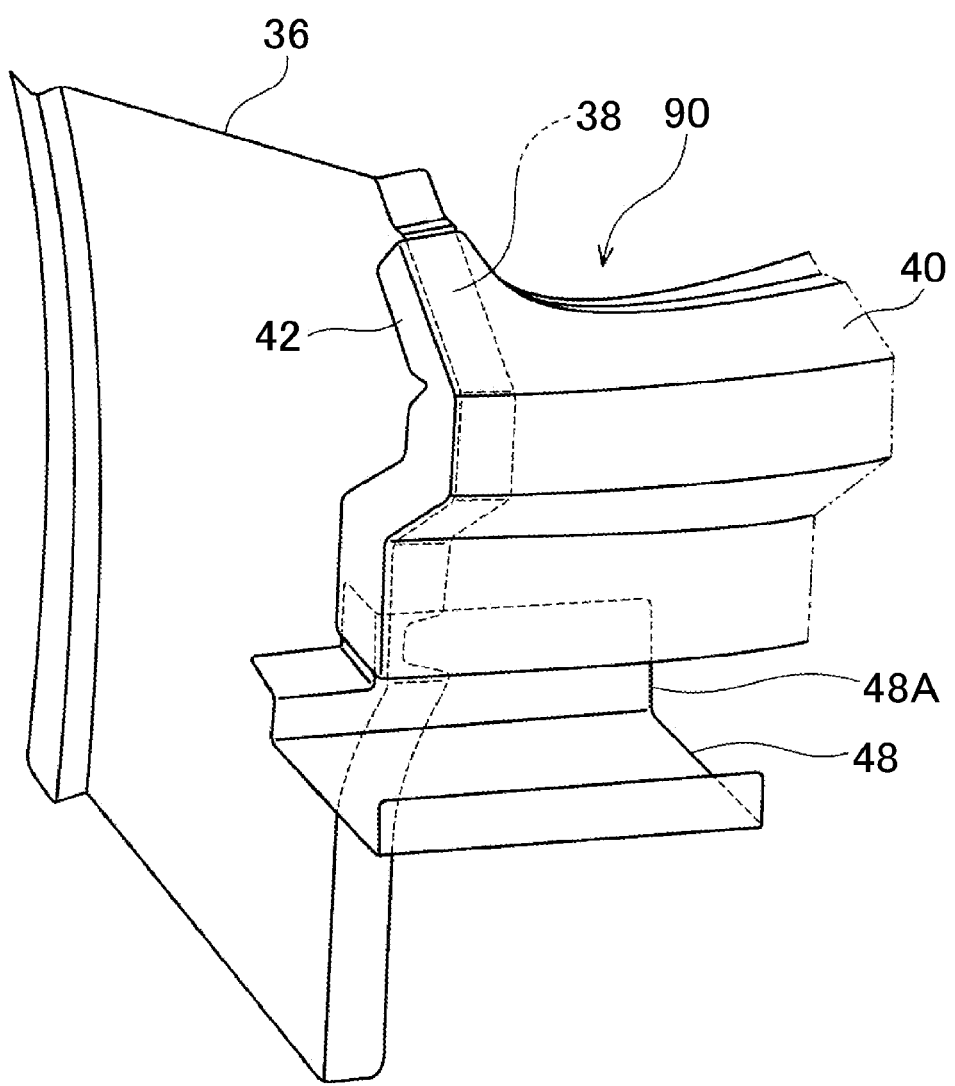
FIG. 7 is a view illustrating an assembly step of the vehicle front of the first embodiment, and represents a perspective view of a first cowl sub-assembly produced by connecting a pillar inner panel of a front pillar, a cowl, and a gutter with one another.

The pillar inner panel 36 extends further on the front side in the vehicle front-rear direction than the flange 34 of the pillar outer panel 32, and the leading end of the pillar inner panel 36 is bent toward the inside in the vehicle width direction to form an inner-side bent portion 38 (see also FIG. 7).

As shown in FIG. 4 and FIG. 5, the end of the cowl 40 on the outside in the vehicle width direction is bent toward the rear side in the vehicle front-rear direction to form a cowl-side bent portion 42 (see also FIG. 7).

The cowl-side bent portion 42 is laid and connected by welding on the outside in the vehicle width direction of the front end 36A of the pillar inner panel 36, while the inner-side bent portion 38 is laid and connected by welding on the rear side in the vehicle front-rear direction of the cowl 40. The connection part between the cowl-side bent portion 42 and the pillar inner panel 36 is sealed with a foaming sealer W2, while the connection part between the inner-side bent portion 38 and the cowl 40 is sealed with a foaming sealer W3 (see also FIG. 1 and FIG. 2). Moreover, as shown in FIG. 4, the end on the inside in the vehicle width direction of the connection part between the inner-side bent portion 38 and the cowl 40 is sealed with a coating sealer T1 applied from the side of the vehicle interior 14 (see also FIG. 3).

As shown in FIG. 5, the end of the gusset 50 on the front side in the vehicle front-rear direction is bent toward the inside in the vehicle width direction to form a gusset-side bent portion 52. This gusset-side bent portion 52 is laid on the rear side in the vehicle front-rear direction of the connection part between the inner-side bent portion 38 of the pillar inner panel 36 and the cowl 40. A part of the connection part may be formed by welding.

An end 60A of the cowl reinforcement 60 on the outside in the vehicle width direction is bent toward the rear side in the vehicle front-rear direction to form a reinforcement-side bent portion 62 (see also FIG. 3). This reinforcement-side bent portion 62 is connected by welding on a side surface 50A of the gusset 50 on the inside in the vehicle width direction.

As shown in FIG. 2, the connection part between the lower end 40A of the dashboard panel 20 of the cowl 40 and the side wall 48A of the gutter 48 is sealed with a foaming sealer W5.

As shown in FIG. 6, the dashboard panel 20 is disposed on the rear side in the vehicle front-rear direction of the inner-side bent portion 38 of the pillar inner panel 36, and is connected by welding with the inner-side bent portion 38. The connection part between the dashboard panel 20 and the inner-side bent portion 38 of the pillar inner panel 36 is sealed with a foaming sealer W4. As shown in FIG. 1 and FIG. 3, this foaming sealer W4 extends from the upper end to the inside in the vehicle width direction and seals the connection part between the upper end 20A of the dashboard panel 20 and the side wall 48A of the gutter 48.

As shown in FIG. 6, the end of the dashboard panel 20 on the outside in the vehicle width direction is bent toward the rear side in the vehicle front-rear direction to form a panel-side bent portion 22. The rear-side end in the vehicle front-rear direction of the connection part between the panel-side bent portion 22 and the pillar inner panel 36 is sealed with a coating sealer T2 applied from the side of the vehicle interior 14.

As shown in FIG. 3, this coating sealer T2 is bent toward the inside in the vehicle width direction at the upper end, extends to the inside in the vehicle width direction, and seals the connection part between the upper end 20A of the dashboard panel 20 and the side wall 48A of the gutter 48.

In this embodiment, the connection part between the dashboard panel 20 and the pillar inner panel 36 is separately sealed with a coating sealer T3 applied from the side of the engine room 12.

As shown in FIG. 6, the cutout portion 74 is formed in the part of the cowl top-side inner panel 72 where the gutter 48 is provided, and water V flowing through the gutter 48 is drained to the outside in the vehicle width direction.

Next, assembly steps of the vehicle front 10 will be described using FIG. 7 through FIG. 13. In each assembly step, a foaming sealer is applied to the mating surfaces of the connection parts (welded parts) before the members are connected. To clarify which members are assembled in an applicable drawing, the members assembled in that drawing are indicated by chain lines (hidden lines), while the chain lines (hidden lines) are omitted as appropriate in the drawing of the next step.

As shown in FIG. 7, the pillar inner panel 36 of the front pillar 30 (see FIG. 1 through FIG. 3), the cowl 40, and the gutter 48 are connected with one another to produce a first cowl sub-assembly 90 (see also FIG. 2).

Figure 8:
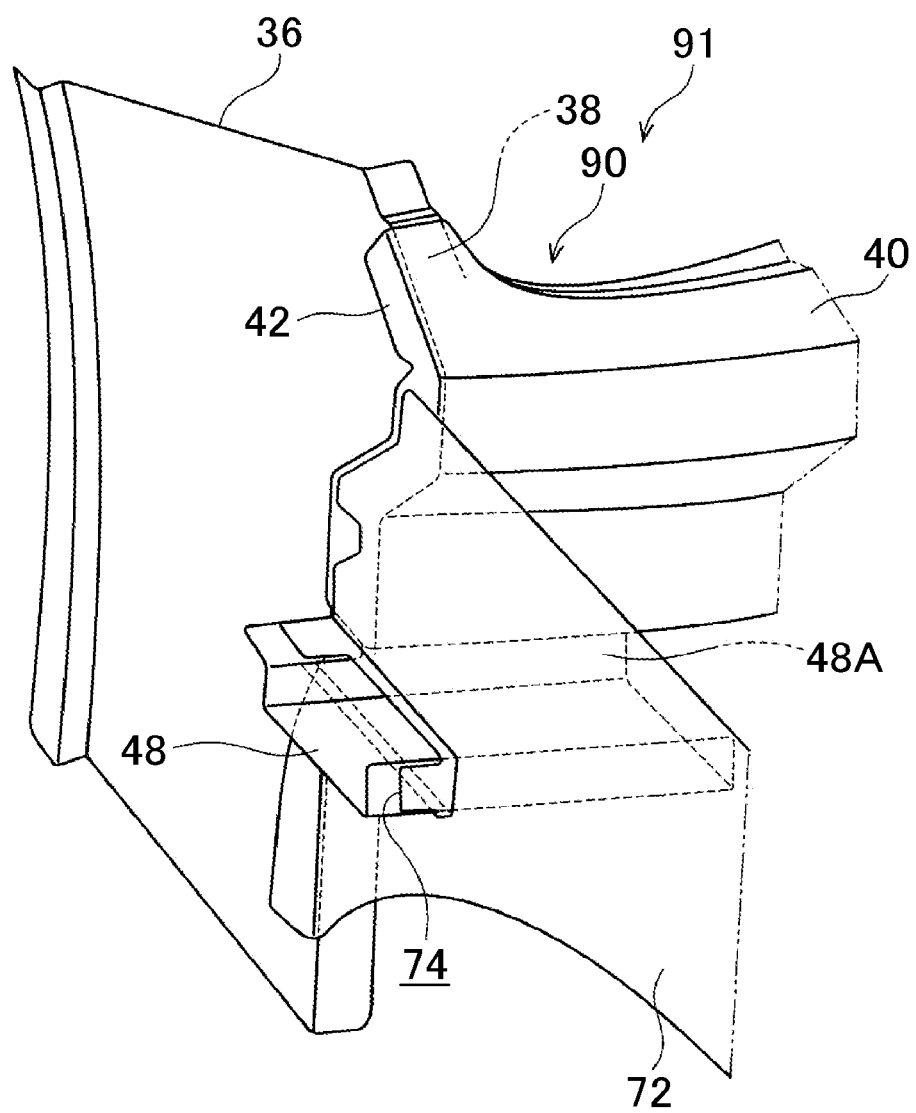
FIG. 8 is a view illustrating an assembly step of the vehicle front of the first embodiment, and represents a perspective view of a second cowl sub-assembly produced by connecting a cowl top-side inner panel to the first cowl sub-assembly of FIG. 7.

As shown in FIG. 8, the cowl top-side inner panel 72 (see also FIG. 5 and FIG. 6) is connected to this first cowl sub-assembly 90 to produce a second cowl sub-assembly 91.

Figure 9:
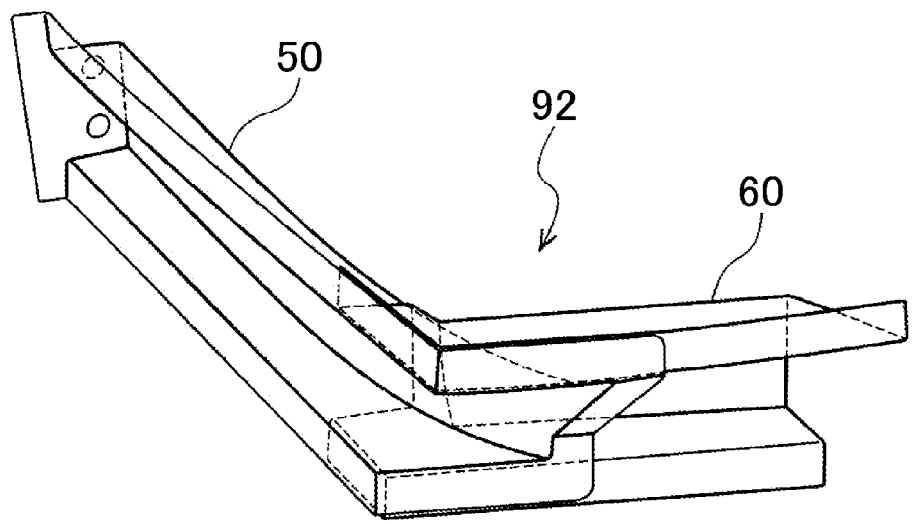
FIG. 9 is a view illustrating an assembly step of the vehicle front of the first embodiment, and represents a perspective view of a cowl reinforcement sub-assembly produced by connecting the cowl reinforcement and the gusset with each other.

As shown in FIG. 9, in a separate step, the cowl reinforcement 60 and the gusset 50 are connected with each other to produce a cowl reinforcement sub-assembly 92.

Figure 10:
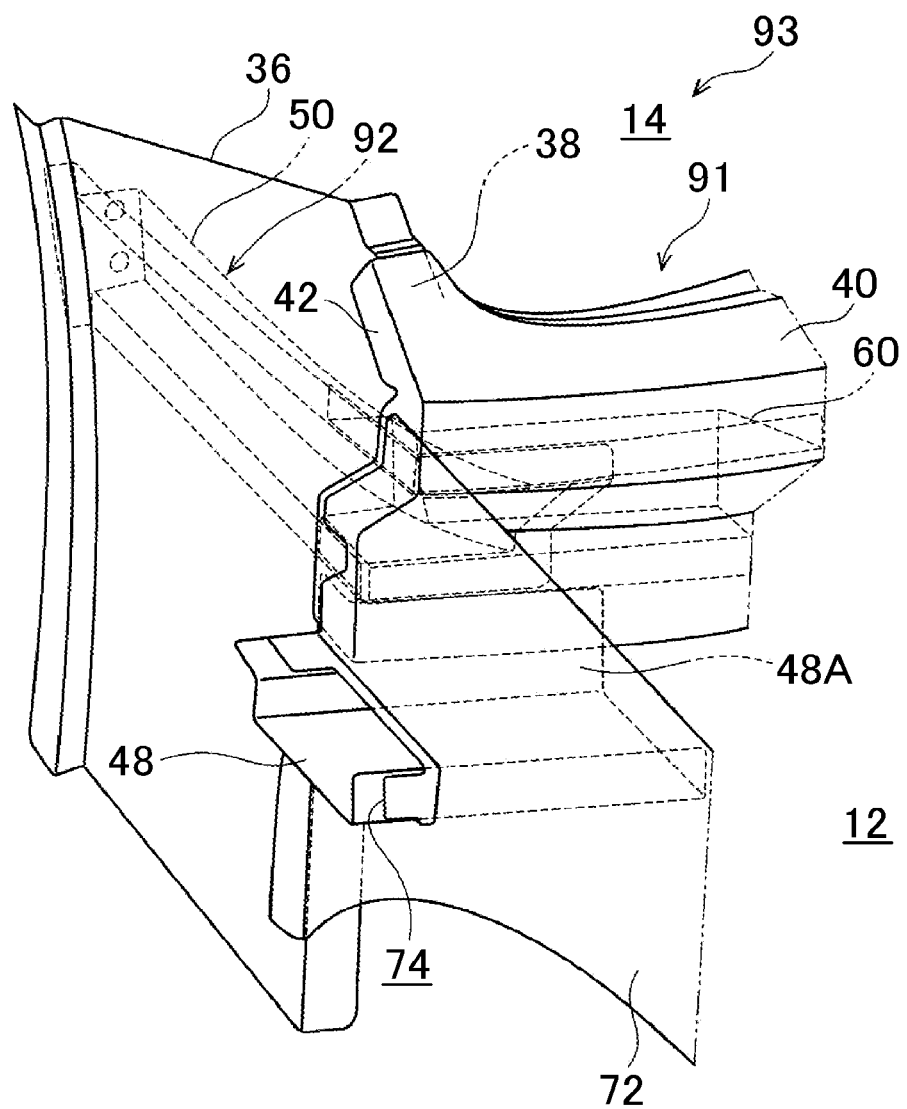
FIG. 10 is a view illustrating an assembly step of the vehicle front of the first embodiment, and represents a perspective view of a third cowl sub-assembly produced by connecting the cowl reinforcement sub-assembly of FIG. 9 to the vehicle interior side of the second cowl sub-assembly of FIG. 8.

As shown in FIG. 10, the cowl reinforcement sub-assembly 92 (see FIG. 9) is connected to the second cowl sub-assembly 91 (see FIG. 8) on the side of the vehicle interior 14 to produce a third cowl sub-assembly 93 (see also FIG. 3 and FIG. 6).

Figure 11:
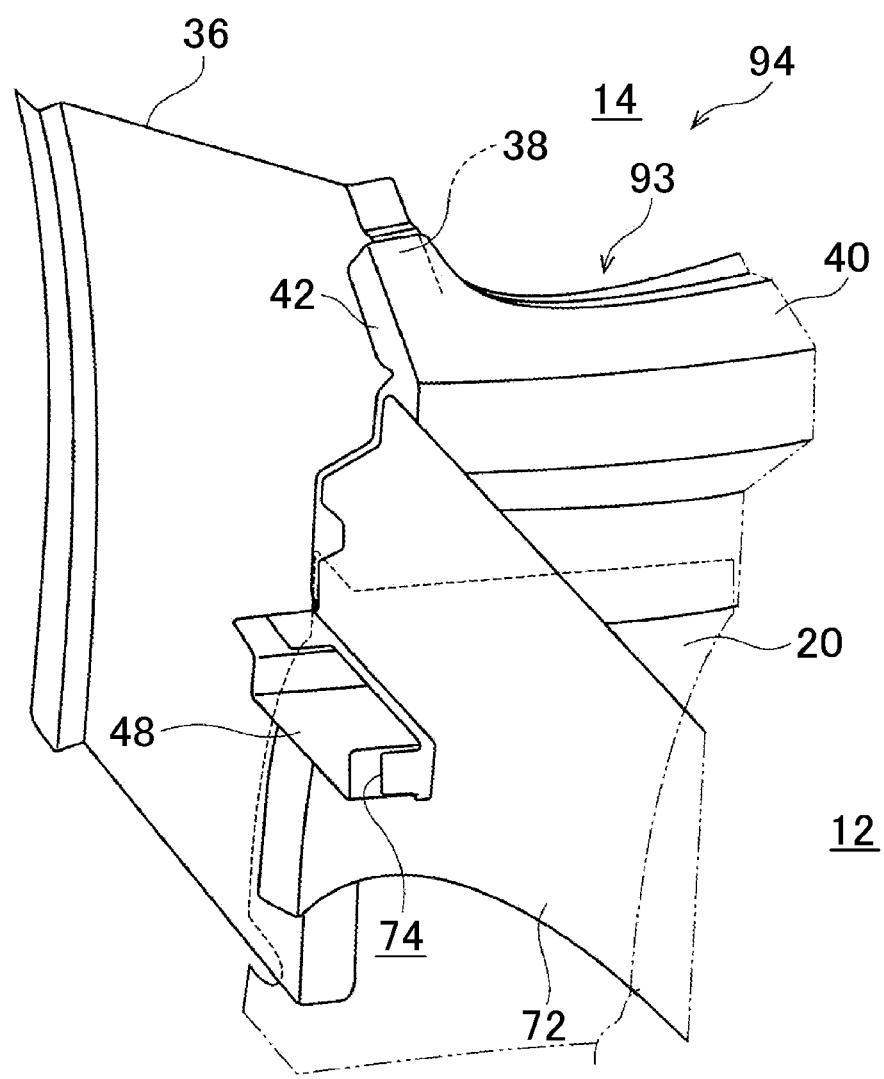
FIG. 11 is a view illustrating an assembly step of the vehicle front of the first embodiment, and represents a perspective view of a dashboard sub-assembly produced by connecting a dashboard panel to the third cowl sub-assembly of FIG. 10.

As shown in FIG. 11, the dashboard panel 20 (see also FIG. 2 and FIG. 3) is connected to the third cowl sub-assembly 93 (see FIG. 10) to produce a dashboard sub-assembly 94.

Figure 12:
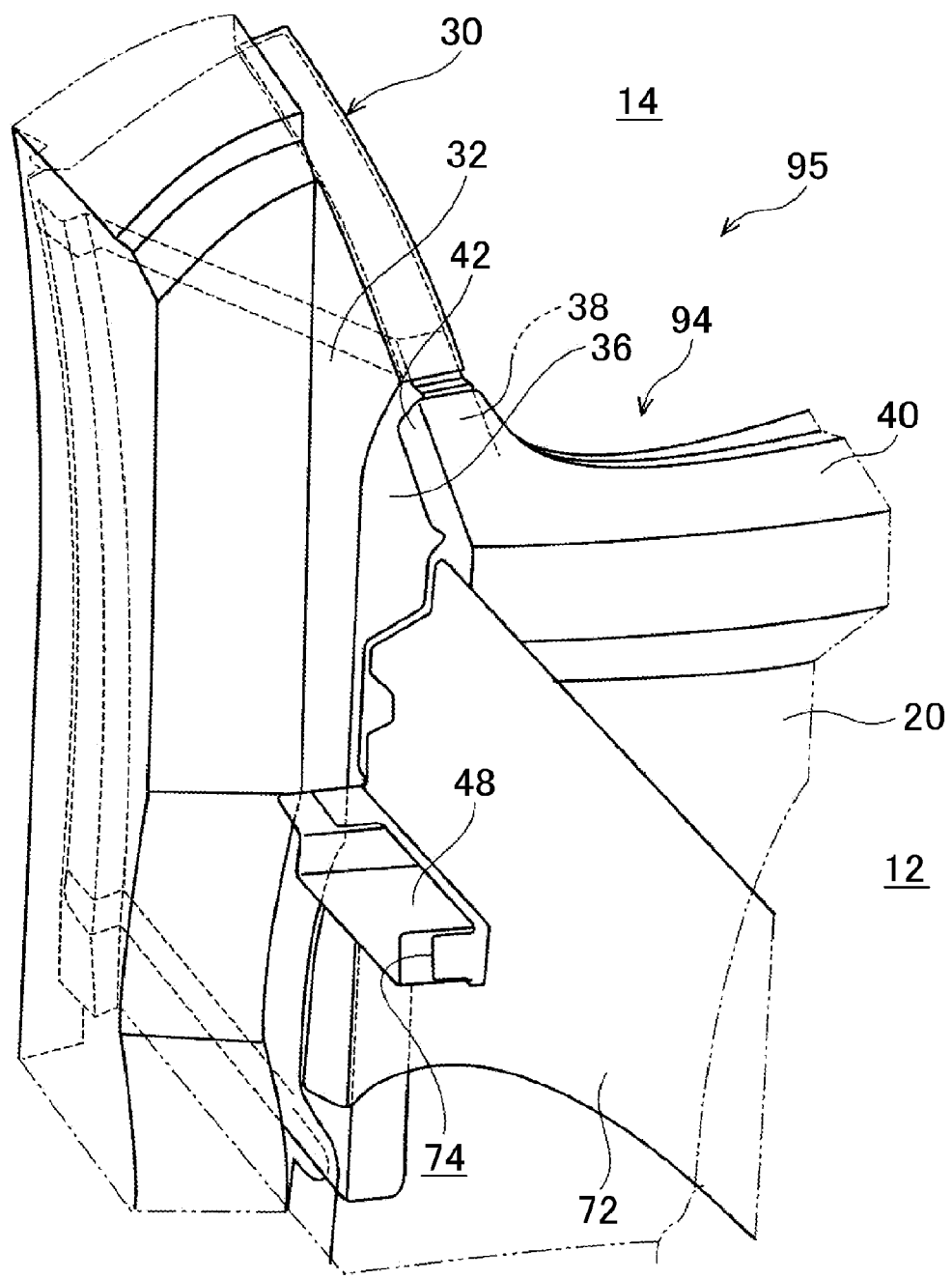
FIG. 12 is a view illustrating an assembly step of the vehicle front of the first embodiment, and represents a perspective view of a first main body assembly produced by connecting a pillar outer panel to the dashboard sub-assembly of FIG. 11.

As shown in FIG. 12, the pillar outer panel 32 (see also FIG. 2 through FIG. 6) is connected to the pillar inner panel 36 of the dashboard sub-assembly 94 (see FIG. 11) on the outside in the vehicle width direction to produce a first main body assembly 95.

As shown in FIG. 13, the cowl top-side outer panel 70 (see also FIG. 5 and FIG. 6) is connected to the first main body assembly 95 (see FIG. 12) on the outside in the vehicle width direction. As mentioned above, FIG. 13 is a view in which the foaming sealers (denoted by the reference sign W) and the chain lines (hidden lines) of FIG. 1 are omitted as appropriate.

The above steps are one example, to which the present invention is not limited. The order of the steps can be changed as appropriate. For example, connection of the pillar outer panel 32 in the step shown in FIG. 12 may be performed during any step.

(Workings and Effects)

Next, the workings and effects of this embodiment will be described.

As shown in FIG. 4 and FIG. 5, the cowl-side bent portion 42 of the cowl 40 is laid and connected by welding on the outside in the vehicle width direction of the front end 36A of the pillar inner panel 36 of the front pillar 30, and moreover, the inner-side bent portion 38 of the pillar inner panel 36 is laid and connected by welding on the rear side in the vehicle front-rear direction of the cowl 40.

Thus, the waterproofing performance is improved, since a ingress path S1 of water into the vehicle interior 14 assumes an L-shape in a plan view and the foaming sealer W2 and the foaming sealer W3 are provided respectively at the two connection parts (welded parts) in the L-shaped ingress path S1. Moreover, the rigidity of the body is enhanced, since the pillar inner panel 36 and the cowl 40 are connected with each other by welding at two positions.

As shown in FIG. 6, the waterproofing performance is improved in the part corresponding to the gutter 48 as well, since an ingress path S2 of water into the vehicle interior 14 assumes an L-shape in a plan view and this part is sealed at two positions respectively with the foaming sealer W4 at the connection part of the L-shaped ingress path S2 and the coating sealer T2 at the outlet-side end of the ingress path S2 (the end on the vehicle rear side of the connection part between the panel-side bent portion 22 and the pillar inner panel 36).

As described using FIG. 7 through FIG. 13, the pillar outer panel 32 of the front pillar 30 is welded onto the pillar inner panel 36 (see FIG. 11 through FIG. 13) after the gusset 50 for rigidity reinforcement is welded onto the pillar inner panel 36 of the front pillar 30 and the cowl 40 (see FIG. 7 through FIG. 10). Therefore, the pillar inner panel 36 and the cowl 40 are connected with each other by welding, and at the same time the gusset 50 for rigidity reinforcement can be connected by welding onto the pillar inner panel 36 and the cowl 40. Thus, the strength of connection between the pillar inner panel 36 and the cowl 40 is enhanced, so that the rigidity of the body is effectively enhanced.

Since the pillar inner panel 36 and the cowl 40 are connected with each other into an assembly, the waterproofing performance of the vehicle interior 14 is improved.

Here, FIG. 21 shows a vehicle front 910 as a comparative example.

As shown in FIG. 21A, a front pillar 930 includes a pillar outer panel 932 and a pillar inner panel 936, and these panels are connected with each other to form a closed cross-section. A cowl-side bent portion 942 of a cowl 940 is laid and connected on the inside in the vehicle width direction of the pillar inner panel 936. As shown in FIG. 21B, the connection part between the pillar inner panel 936 and the cowl-side bent portion 942 of the cowl 940 is sealed with a coating sealer T901 applied from the side of a vehicle interior 914. As shown in FIG. 21C, a gusset 950 for rigidity reinforcement is fastened with bolts, from the side of the vehicle interior 914, on the cowl 940 and the pillar inner panel 936.

Accordingly, as shown in FIG. 21B, the vehicle front 910 of the comparative example has a structure in which a water ingress path S902 runs linearly from the side of an engine room 912 to the vehicle interior 914 (the engine room 912 and the vehicle interior 914 communicate directly with each other through the ingress path S902) and the ingress path 902 is sealed with the coating sealer T901. Thus, with this structure, high waterproofing performance is difficult to achieve.

In addition, since the gusset 950 for rigidity reinforcement is assembled after the coating sealer T901 is applied from the side of the vehicle interior 914, the gusset 950 is fastened with bolts on the cowl 940 and the pillar inner panel 936. Thus, compared with the configuration where these members are connected with one another by welding, the rigidity of the body is not effectively enhanced due to the low strength of connection among the cowl 940, the pillar inner panel 936, and the gusset 950.

By contrast, as shown in FIG. 5, the vehicle front 10 of this embodiment has a structure in which the ingress path S1 of water into the vehicle interior 14 has an L-shape in a plan view and the engine room 12 and the vehicle interior 14 do not directly communicate with each other. Moreover, the foaming sealer W2 and the foaming sealer W3 are provided respectively at two positions in the L-shaped ingress path S1. Thus, the vehicle front 10 of this embodiment can achieve higher waterproofing performance than the comparative example.

Furthermore, since the gusset 50 for rigidity reinforcement is connected by welding on the pillar inner panel 36 and the cowl 40, the rigidity of the body is more effectively enhanced than in the comparable example.

Next, a modified example of this embodiment will be described. FIG. 14A is the same view as FIG. 5.

As shown in FIG. 14A, in the vehicle front 10 of the above-described embodiment, the gusset-side bent portion 52 of the gusset 50 is laid and connected on the rear side in the vehicle front-rear direction of the connection part between the inner-side bent portion 38 of the pillar inner panel 36 and the cowl 40, and the reinforcement-side bent portion 62 of the cowl reinforcement 60 is connected on the side surface 50A of the gusset 50 on the outside in the vehicle width direction. That is, the vehicle front 10 of the above embodiment has a gusset-prioritized structure in which the gusset 50 is given priority.

By contrast, in a vehicle front 11 of the modified example shown in FIG. 14B, the end of a cowl reinforcement 61 extends to the pillar inner panel 36, and a reinforcement-side bent portion 63 is connected on the inside in the vehicle width direction of the front end 36A of the pillar inner panel 36. The gusset-side bent portion 52 of the gusset 50 is connected on a side surface 61B of the cowl reinforcement 61 on the rear side in the vehicle front-rear direction. That is, the vehicle front 11 of the modified example has a cowl reinforcement-prioritized structure in which the cowl reinforcement 61 is given priority.

The gusset-prioritized structure of FIG. 14A effectively enhances the rigidity of the body especially in the vehicle front-rear direction, since the gusset 50 is connected with the pillar inner panel 36 of the front pillar 30 and the cowl 40.

On the other hand, the cowl reinforcement-prioritized structure of FIG. 14B effectively enhances the rigidity of the body especially in the vehicle width direction, since the end of the cowl reinforcement 61 extends to the pillar inner panel 36 and the reinforcement-side bent portion 63 is connected on the inside in the vehicle width direction of the front end 36A of the pillar inner panel 36.

While not shown, a vehicle front structure of yet another modified example may be such that the inner-side bent portion 38 is not formed on the pillar inner panel 36 shown in FIG. 3 and the foaming sealer W3 is not provided. In such a structure, the waterproofing performance is improved, since the water ingress path runs from the rear side toward the front side in the vehicle front-rear direction and the foaming sealer W2 is provided in the ingress path.

Next, a vehicle front structure according to a second embodiment of the present invention will be described using FIG. 15 through FIG. 20. Description that would be a repetition of what has been described in the first embodiment will be omitted.

First, a general description will be given of the overall structure of a vehicle front 110 of this embodiment.

Figure 20:
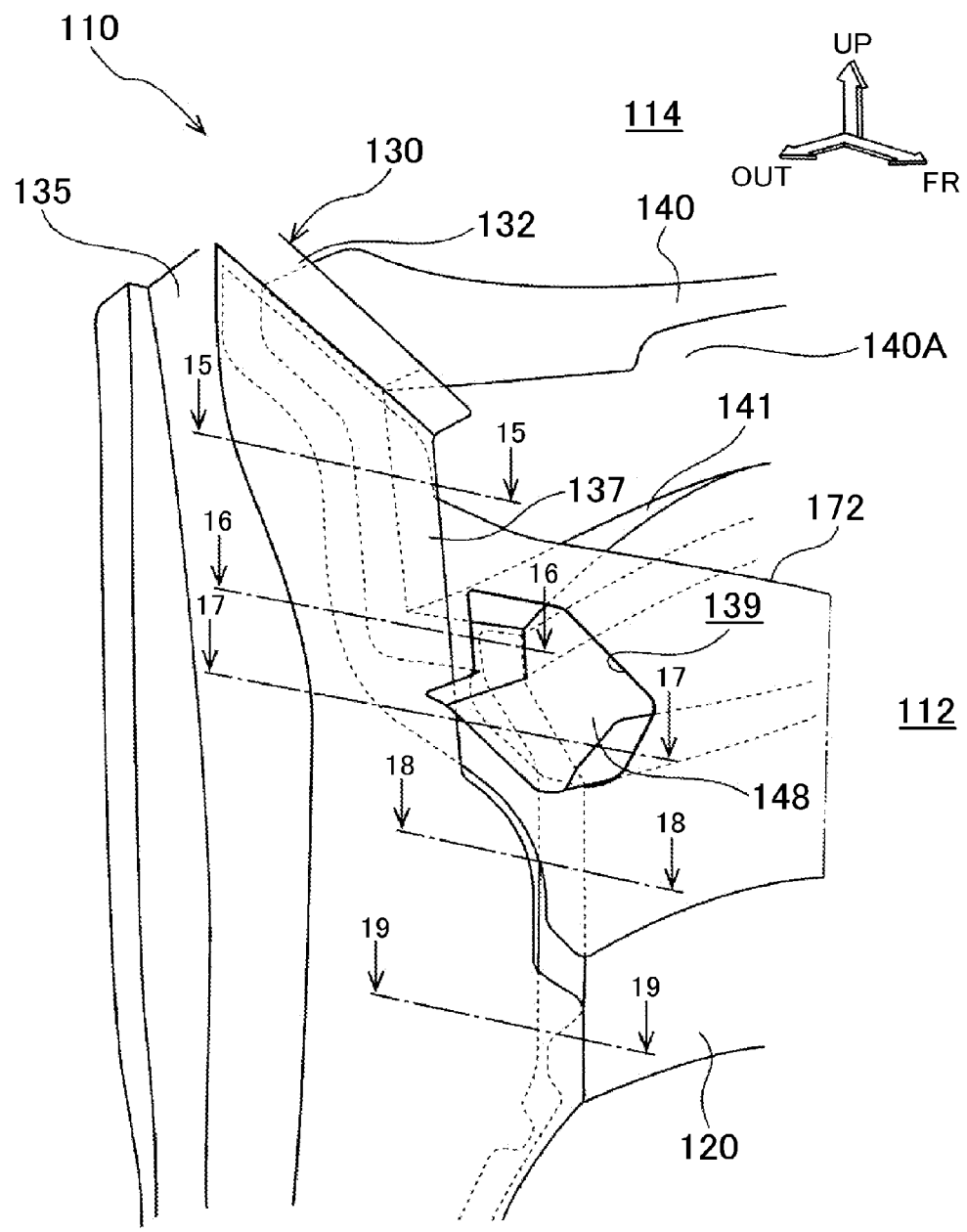
FIG. 20 is an oblique external perspective view of a vehicle front of a second embodiment from a front side in a vehicle front-rear direction.

As shown in FIG. 20, the vehicle front 110 is provided with a front pillar 130 along the vehicle upper-lower direction, on a vehicle side part on the outside in the vehicle width direction. A pillar inner panel 136 of the front pillar 130 is composed of a rear-side inner panel 135 constituting the rear side in the vehicle front-rear direction, and a front-side inner panel 137 constituting the front side in the vehicle front-rear direction (see also FIG. 15). A cowl top-side inner panel 172 extending on the front side in the vehicle front-rear direction is formed on the front-side inner panel 137 (see also FIG. 15).

The vehicle front 110 is provided with a dashboard panel 120 that separates between an engine room 112 and a vehicle interior 114. A part of the dashboard panel 120 on the outside in the vehicle width direction is connected with the front pillar 130 (see also FIG. 16).

A panel-shaped cowl 140 extending in the vehicle width direction is disposed on the upper side in the vehicle upper-lower direction of the dashboard panel 120, and the cowl 140 is connected with the dashboard panel 120 and the front pillar 130.

A shelf 141 is formed in a part on the outside in the vehicle width direction of the cowl 140 corresponding to the upper side in the vehicle upper-lower direction of the dashboard panel 120, and an upper portion 140A of the cowl 140 rises from the end of the shelf 141 on the rear side in the vehicle front-rear direction.

An inverted trapezoid-shaped gutter 148 extending in the vehicle width direction and serving as a water passage is formed on the lower side in the vehicle upper-lower direction of the shelf 141 of the cowl 140 (see also FIG. 17). In this embodiment, the gutter 148 is integrally molded on the cowl 140. However, the cowl and the gutter may be separate members as in the first embodiment.

A cutout hole 139 is formed (see also FIG. 17) in a part, where the gutter 148 of the cowl 140 is provided, of the cowl top-side inner panel 172 that is formed on the front-side inner panel 137 of the pillar inner panel 136 of the front pillar 130 and extends on the front side in the vehicle front-rear direction.

While not shown, a cowl top-side outer panel is provided on the outside in the vehicle width direction of the cowl top-side inner panel 172.

Next, the structure of the major part of the vehicle front 110 of this embodiment will be described. An inner-side bent portion 138 and a foaming sealer W19 indicated by the imaginary lines (two-dot chain lines) in FIG. 15 will be described later in a modified example.

As shown in FIG. 15, the front pillar 130 includes a pillar outer panel 132 having a hat-shaped cross-section that is disposed so as to be open on the inside in the vehicle width direction and constitutes the outside in the vehicle width direction of the front pillar 130, and the pillar inner panel 136 that constitutes the inside in the vehicle width direction of the front pillar 130. These panels are connected with each other to form a closed cross-section.

As described above, the pillar inner panel 136 has the rear-side inner panel 135 constituting the rear side in the vehicle front-rear direction and the front-side inner panel 137 constituting the front side in the vehicle front-rear direction, and the cowl top-side inner panel 172 extending on the front side in the vehicle front-rear direction is formed on the front-side inner panel 137.

Between a flange 134 on the front side and a flange 133 on the rear side in the vehicle front-rear direction of the pillar outer panel 132, a rear end 137A of the front-side inner panel 137 is laid and connected by welding on the outside in the vehicle width direction of a front end 135A of the rear-side inner panel 135.

The end of the cowl 140 on the outside in the vehicle width direction is bent toward the rear side in the vehicle front-rear direction to form a cowl-side bent portion 142. This cowl-side bent portion 142 is held (laid) and connected by welding between the front end 135A of the rear-side inner panel 135 disposed on the inside in the vehicle width direction and the rear end 137A of the front-side inner panel 137 disposed on the outside in the vehicle width direction.

The upper portion 140A of the cowl 140 further on the upper side than the shelf 141 is disposed further on the rear side in the vehicle front-rear direction than the flange 134 on the front side in the vehicle front-rear direction of the pillar outer panel 132.

A gusset 150 for rigidity reinforcement is connected by welding on the rear-side inner panel 135 and the cowl 140, and a cowl reinforcement 160 is connected with the gusset 150.

The end of the gusset 150 on the front side in the vehicle front-rear direction is bent toward the inside in the vehicle width direction to form a gusset-side bent portion 152. The gusset-side bent portion 152 may be connected with the cowl 140 partially by welding.

The end of the cowl reinforcement 160 on the outside in the vehicle width direction is bent toward the rear side in the vehicle front-rear direction to form a reinforcement-side bent portion 162. This reinforcement-side bent portion 162 is connected by welding on the side surface 150A of the gusset 150 on the inside in the vehicle width direction.

A part on the rear side in the vehicle front-rear direction of the connection part between the front end 135A of the rear-side inner panel 135 and the rear end 137A of the front-side inner panel 137 of the pillar inner panel 136 is sealed with a foaming sealer W11.

The connection part between the cowl-side bent portion 142 of the cowl 140 and the rear end 137A of the front-side inner panel 137 is sealed with a foaming sealer W12, while the connection part between the cowl-side bent portion 142 of the cowl 140 and the front end 135A of the rear-side inner panel 135 is sealed with a foaming sealer W13.

The connection part between the flange 134 of the pillar outer panel 132 on the front side in the vehicle front-rear direction and the front-side inner panel 137 is sealed with a foaming sealer W14.

As shown in FIG. 16, the rear-side inner panel 135 of the pillar inner panel 136 extends further on the lower side than the shelf 141 (see FIG. 20) of the cowl 140, and further on the front side in the vehicle front-rear direction than the flange 134 on the front side of the pillar outer panel 132. The rear end 137A of the front-side inner panel 137, the cowl-side bent portion 142 of the cowl 140, the front end 135A of the rear-side inner panel 135, and the dashboard panel 120 are laid on top of one another in this order and connected with one another by welding.

The foaming sealer W12 and the foaming sealer W13 extend on the front side in the vehicle front-rear direction, up to the part where the dashboard panel 120 is connected.

The connection part between the dashboard panel 120 and the front end 135A of the rear-side inner panel 135 is sealed with a foaming sealer W15. This foaming sealer W15 extends on the outside in the vehicle width direction, and also seals the connection part between the dashboard panel 120 and the cowl 140. In other words, the foaming sealer W15 is a sealer integrating the foaming sealer at the connection part between the dashboard panel 120 and the front end 135A of the rear-side inner panel 135 and the foaming sealer at the connection part between the dashboard panel 120 and the cowl 140.

The end on the outside in the vehicle width direction of the connection part between the dashboard panel 120 and the front end 135A of the rear-side inner panel 135 is sealed with a coating sealer T11 applied from the side of the vehicle interior 114.

As shown in FIG. 17, the cutout hole 139 (see also FIG. 20) is formed in the part, where the gutter 148 of the cowl 140 is provided, of the cowl top-side inner panel 172 formed on the front-side inner panel 137, and the water V flowing through the gutter 148 is drained to the outside in the vehicle width direction.

Figure 19:
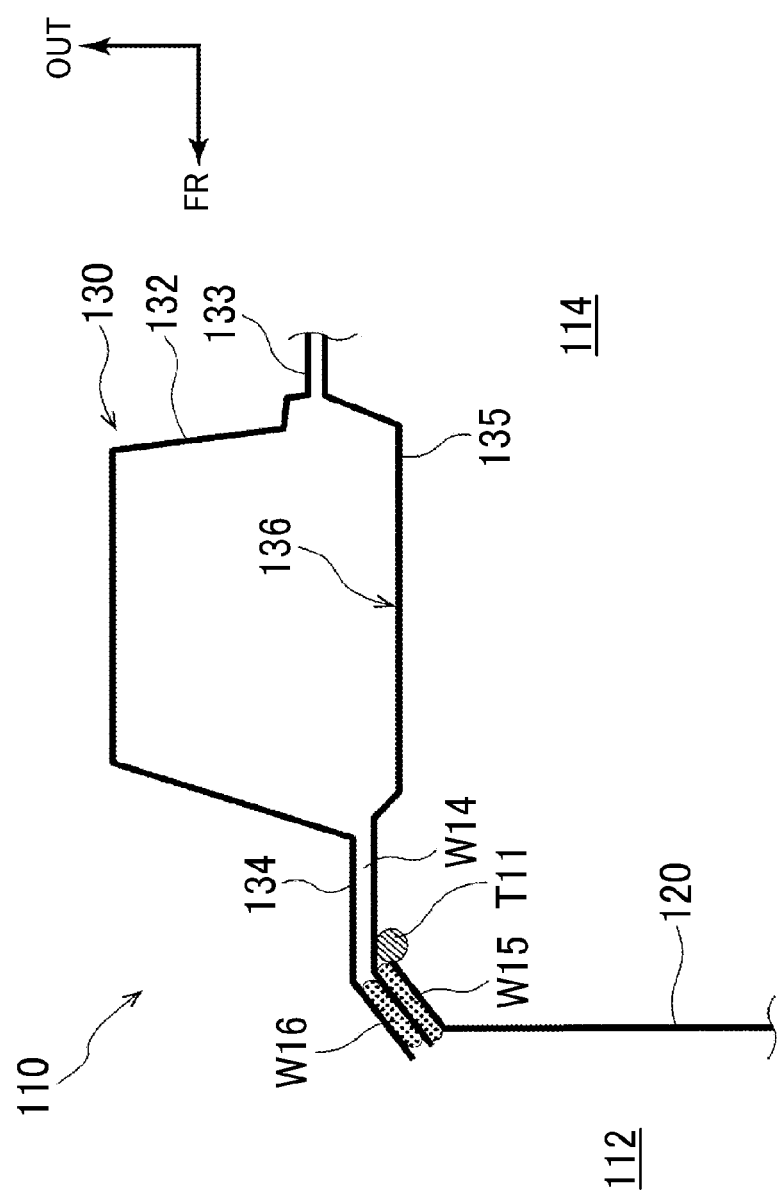
FIG. 19 is a cross-sectional view along the line 19-19 of FIG. 20.

As shown in FIG. 18, the front-side inner panel 137 extends further on the lower side in the vehicle upper-lower direction than the gutter 148 (see FIG. 17 and FIG. 20), only further to the front side in the vehicle front-rear direction than the flange 134 on the front side of the pillar outer panel 132. Accordingly, as shown in FIG. 18 and FIG. 19, the pillar inner panel 136 of the front pillar 130 is composed substantially only of the rear-side inner panel 135.

Next, assembly steps of the vehicle front 110 will be described. Throughout the assembly steps, the members are assembled in accordance with the first embodiment, and a foaming sealer is applied to the mating surfaces of the connection parts (welded parts) before the members are connected in each assembly step. The following steps are one example, to which the present invention is not limited. The order of the steps can be changed as appropriate.

The rear-side inner panel 135 and the front-side inner panel 137, which constitute the pillar inner panel 136, and the cowl 140 shown in FIG. 15 are connected with one another to produce a cowl sub-assembly.

A cowl reinforcement sub-assembly, which is produced in a separate step by connecting the cowl reinforcement 160 and the gusset 150 with each other, is connected to the cowl sub-assembly to produce a second cowl sub-assembly.

In a subsequent assembly step, the pillar outer panel 132 to be disposed on the outside in the vehicle width direction is connected.

(Workings and Effects)

Next, the workings and effects of this embodiment will be described.

As shown in FIG. 15, between the flange 134 on the front side and the flange 133 on the rear side in the vehicle front-rear direction of the pillar outer panel 132 of the front pillar 130, the rear end 137A of the front-side inner panel 137 is laid and connected on the outside in the vehicle width direction of the front end 135A of the rear-side inner panel 135 of the pillar inner panel 136.

On the front side in the vehicle front-rear direction of the foaming sealer W11 at the connection part between the front end 135A of the rear-side inner panel 135 and the rear end 137A of the front-side inner panel 137, the cowl-side bent portion 142 of the cowl 140 is held and connected between the front end 135A of the rear-side inner panel 135 and the rear end 137A of the front-side inner panel 137.

The connection part between the cowl-side bent portion 142 of the cowl 140 and the rear end 137A of the front-side inner panel 137 is sealed with the foaming sealer W12, while the connection part between the cowl-side bent portion 142 of the cowl 140 and the front end 135A of the rear-side inner panel 135 is sealed with the foaming sealer W13.

Accordingly, the waterproofing performance is improved, since an ingress path S11 of water into the vehicle interior 114 assumes a U-shape in a plan view and the foaming sealer W12 and the foaming sealer W13 are provided respectively at two positions in the U-shaped ingress path S11. Moreover, the rigidity of the body is secured, since the pillar inner panel 136 and the cowl 140 are connected with each other by welding.

As shown in FIG. 15, the pillar outer panel 132 is connected on the outside in the vehicle width direction of the pillar inner panel 136 in which the cowl-side bent portion 142 is held and connected between the front end 135A of the rear-side inner panel 135 and the rear end 137A of the front-side inner panel 137. Thus, it is possible to set the position in the vehicle front-rear direction of the pillar outer panel 132 regardless of the position of connection between the cowl 140 and the pillar inner panel 136.

It is therefore possible to freely set the position in the vehicle front-rear direction of the front pillar 130 (pillar outer panel 132) according to the design while improving the waterproofing performance by providing the foaming sealer W12 and the foaming sealer W13 respectively at two positions in the ingress path S11 of water into the vehicle interior 114.

In this embodiment, the connection part of the cowl 140 is located between the flange 134 on the front side and the flange 133 on the rear side in the vehicle front-rear direction of the pillar outer panel 132 of the front pillar 130. That is, the part of the front pillar 130 having a closed cross-sectional structure and the part where the cowl 140 is connected overlap in the vehicle front-rear direction. Thus, the strength of connection between the front pillar 130 and the cowl 140 is further enhanced, so that the rigidity of the body is further enhanced.

The pillar outer panel 132 of the front pillar 130 is welded onto the pillar inner panel 136 after the gusset 150 for rigidity reinforcement is welded onto the pillar inner panel 136 of the front pillar 130 and the cowl 140. Thus, the pillar inner panel 136 and the cowl 140 are connected with each other by welding, and at the same time the gusset 150 can be connected by welding onto the pillar inner panel 136 and the cowl 140. Therefore, the strength of connection between the pillar inner panel 136 and the cowl 140 is enhanced, so that the rigidity of the body is effectively enhanced.

The waterproofing performance of the vehicle interior 114 is improved, since the pillar inner panel 136 and the cowl 140 are connected into an assembly.

In the part shown in FIG. 16, the ingress path of water into the vehicle interior 114 has a labyrinthine shape due to the combination of plates, and the waterproofing performance is secured by the foaming sealer W12, the foaming sealer W13, the foaming sealer W15, and the coating sealer T11.

As shown in FIG. 17 through FIG. 19, the lower part in the vehicle upper-lower direction of the vehicle front 110 is sealed and waterproofed with the foaming sealer W15, the foaming sealer W16, and the coating sealer T11.

Next, a modified example of this embodiment will be described.

As indicated by the imaginary lines (two-dot chain lines) of FIG. 15, the vehicle front structure may be such that the inner-side bent portion 138 is formed on the rear-side inner panel 135, and that this inner-side bent portion 138 is laid and connected by welding on the rear side in the vehicle front-rear direction of the cowl 140 and sealed with the foaming sealer W19 (see also FIG. 5 of the first embodiment).

The waterproofing performance is further improved and the rigidity of the body is further enhanced if such a structure is adopted in which the inner-side bent portion 138 is formed on the rear-side inner panel 135 and this inner-side bent portion 138 is connected with the cowl 140 by welding and sealed with the foaming sealer W19.

The present invention is not limited to the above-described embodiments.

It goes without saying that various aspects of the present invention can be implemented without departing from the scope of the invention.

What is claimed is:

1. A vehicle front structure comprising:
   a front pillar extending on a vehicle side part, in a vehicle upper-lower direction, the front pillar including a pillar outer panel and a pillar inner panel, the pillar outer panel being disposed on an outside in a vehicle width direction, the pillar inner panel being disposed on an inside in the vehicle width direction, the pillar outer panel and the pillar inner panel forming a closed cross-section; and
   a cowl extending in the vehicle width direction,
   wherein the pillar inner panel includes an inner-side bent portion, the inner-side bent portion being an end of the cowl on a front side in a vehicle front-rear direction that is bent toward the inside in the vehicle width direction, the inner-side bent portion being laid and welded on a rear side in the vehicle front-rear direction of the cowl, wherein the cowl includes a cowl-side bent portion, the cowl-side bent portion being an end of the cowl on the outside in the vehicle width direction that is bent toward the rear side in the vehicle front-rear direction, the cowl-side bent portion being laid and welded on the outside in the vehicle width direction of a front end of the pillar inner panel, wherein the pillar inner panel includes a rear-side inner panel and a front-side inner panel, the rear-side inner panel constituting the rear side in the vehicle front-rear direction, the front-side inner panel constituting the front-side in the vehicle front-rear direction, and wherein a rear end of the front-side inner panel is laid and welded on the outside in the vehicle width direction of a front end of the rear-side inner panel, and the cowl-side bent portion is held between the front end of the rear-side inner panel and the rear end of the front-side inner panel.

2. The vehicle front structure according to claim 1, further comprising a gusset that is welded on the inside in the vehicle width direction of the pillar inner panel and on the rear side in the vehicle front-rear direction of the cowl.

3. An assembly method of a vehicle front structure, the vehicle front structure including a front pillar, a cowl, and a gusset, the front pillar extending on a vehicle side part, in a vehicle upper-lower direction, the front pillar including a pillar outer panel and a pillar inner panel, the pillar outer panel being disposed on an outside in a vehicle width direction, the pillar inner panel being disposed on an inside in the vehicle width direction, the pillar outer panel and the pillar inner panel forming a closed cross-section, the cowl extending in the vehicle width direction, the cowl including a cowl-side bent portion, the cowl-side bent portion being an end of the cowl on the outside in the vehicle width direction that is bent toward a rear side in a vehicle front-rear direction, the cowl-side bent portion being laid and welded on the outside in the vehicle width direction of a front end of the pillar inner panel, the gusset being welded on the inside in the vehicle width direction of the pillar inner panel and on the rear side in the vehicle front-rear direction of the cowl, the assembly method comprising:

welding the pillar inner panel and the cowl with each other;

welding the gusset onto the welded pillar inner panel and cowl; and welding the pillar outer panel onto the pillar inner panel on which the gusset has been welded.

* * * * *